United States Patent
Lee

(10) Patent No.: US 12,499,889 B2
(45) Date of Patent: Dec. 16, 2025

(54) METHOD AND APPARATUS FOR PROVIDING VOICE ASSISTANT SERVICE

(71) Applicant: Samsung Electronics Co., Ltd., Suwon-si (KR)

(72) Inventor: Kyuyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 283 days.

(21) Appl. No.: 18/144,348

(22) Filed: May 8, 2023

(65) Prior Publication Data

US 2023/0274739 A1 Aug. 31, 2023

Related U.S. Application Data

(63) Continuation of application No. PCT/KR2023/002305, filed on Feb. 16, 2023.

(30) Foreign Application Priority Data

Feb. 16, 2022 (KR) .................. 10-2022-0020395

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
CPC ... G10L 15/22; G10L 15/30; G10L 2015/223; G06F 11/3013; G06F 11/3409; G06F 2209/501; G06F 9/5027; G06F 3/167; G06F 9/505; G06F 11/3414; G06F 2209/5017; G06F 2209/5022; H04L 67/60; G06N 3/08
See application file for complete search history.

(56) References Cited

U.S. PATENT DOCUMENTS

| | | | |
|---|---|---|---|
| 9,106,521 B2 | 8/2015 | Bae | |
| 9,147,395 B2 | 9/2015 | Kim et al. | |
| 10,068,572 B2 | 9/2018 | Choi et al. | |
| 10,339,934 B2 | 7/2019 | Sung et al. | |
| 10,629,203 B2 * | 4/2020 | Nair | G06F 3/167 |
| 10,643,605 B2 | 5/2020 | Ryu et al. | |

(Continued)

FOREIGN PATENT DOCUMENTS

| | | |
|---|---|---|
| JP | 2018-138987 | 9/2018 |
| JP | 2021-509730 | 4/2021 |

(Continued)

OTHER PUBLICATIONS

International Search Report dated May 23, 2023 issued in PCT/KR2023/002305.

*Primary Examiner* — Abul K Azad

(74) *Attorney, Agent, or Firm* — STAAS & HALSEY LLP

(57) ABSTRACT

A method, performed by an electronic device, of providing a voice assistant service may include: obtaining voice data including an input of a voice of a user; according to a performance level based on performance state information of the electronic device, identifying a processing path for obtaining a response corresponding to the voice of the user and processing a user interface (UI) corresponding to the response; and based on the identified processing path, performing control operations to process the voice data and obtain and output the processed UI.

20 Claims, 17 Drawing Sheets

(56) References Cited

U.S. PATENT DOCUMENTS

| | | |
|---|---|---|
| 10,741,191 B2 * | 8/2020 | Kim .................. G10L 25/78 |
| 10,950,230 B2 | 3/2021 | Kojima |
| 11,011,162 B2 | 5/2021 | Patel et al. |
| 11,222,624 B2 | 1/2022 | Kim et al. |
| 11,475,891 B2 | 10/2022 | Jang et al. |
| 11,475,893 B2 | 10/2022 | Lee et al. |
| 2008/0059195 A1 * | 3/2008 | Brown .................. G10L 15/22 |
| | | 704/270 |
| 2014/0244712 A1 * | 8/2014 | Walters .................. H04L 67/10 |
| | | 709/202 |
| 2016/0232401 A1 | 8/2016 | Hoyos et al. |
| 2019/0199845 A1 * | 6/2019 | Choi .................. G06F 3/04817 |
| 2020/0111490 A1 * | 4/2020 | Jang .................. G10L 15/22 |
| 2021/0074299 A1 * | 3/2021 | Hwang ............ G06F 16/90332 |
| 2021/0210102 A1 | 7/2021 | Huh et al. |
| 2022/0328047 A1 | 10/2022 | Fukutomi et al. |
| 2022/0358916 A1 * | 11/2022 | Karri .................. G06F 3/013 |

FOREIGN PATENT DOCUMENTS

| | | |
|---|---|---|
| KR | 10-2008-0087571 | 10/2008 |
| KR | 10-2014-0001711 | 1/2014 |
| KR | 10-1471366 | 12/2014 |
| KR | 10-2015-0043807 | 4/2015 |
| KR | 10-1700099 | 1/2017 |
| KR | 10-2017-0060507 | 6/2017 |
| KR | 10-2020-0143940 | 12/2020 |
| KR | 10-2225984 | 3/2021 |
| KR | 10-2021-0089295 | 7/2021 |
| KR | 10-2021-0099293 | 8/2021 |
| WO | WO 2019/136065 A1 | 7/2019 |
| WO | WO 2020/111292 A1 | 6/2020 |
| WO | WO 2020/245912 | 12/2020 |

* cited by examiner

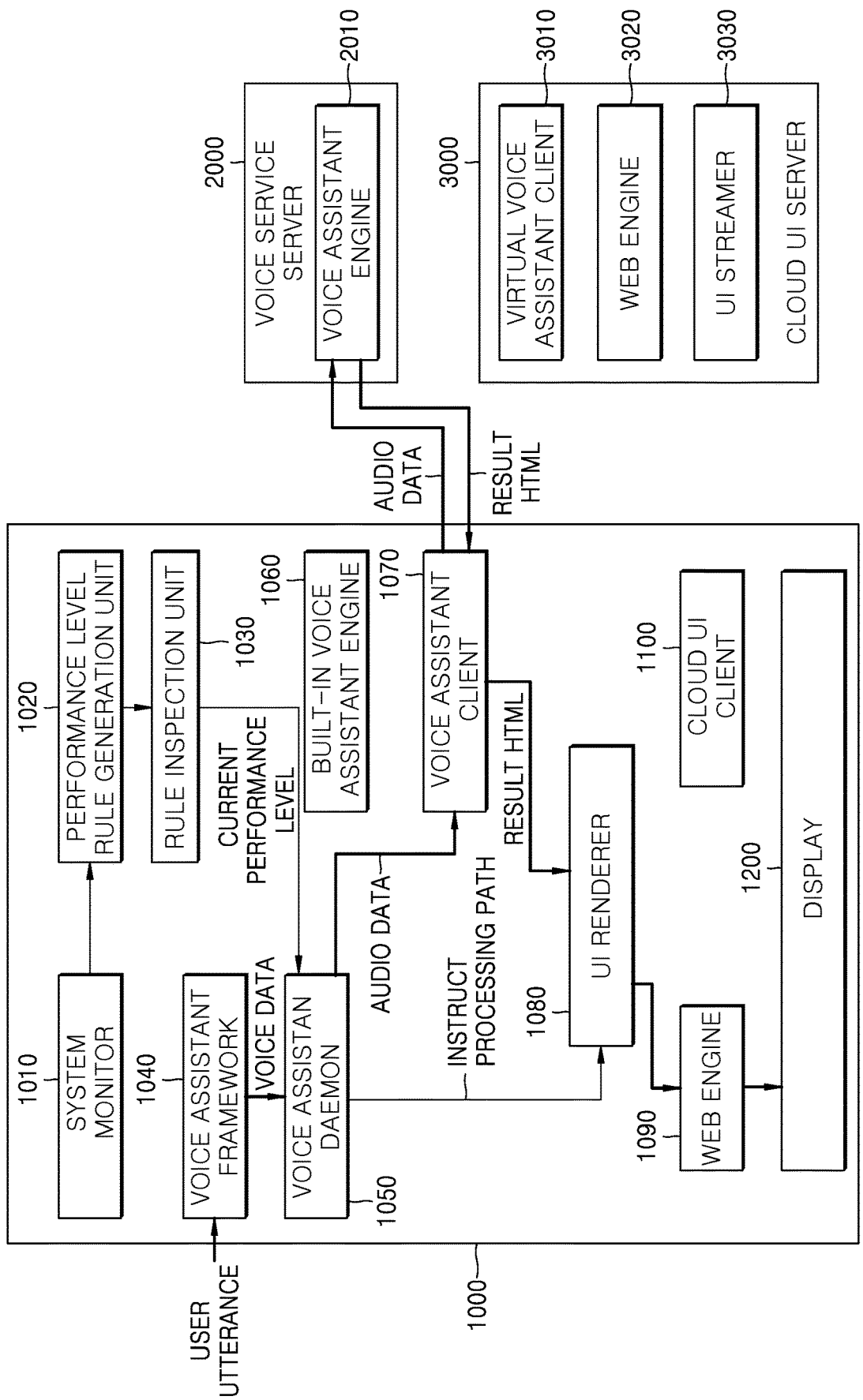

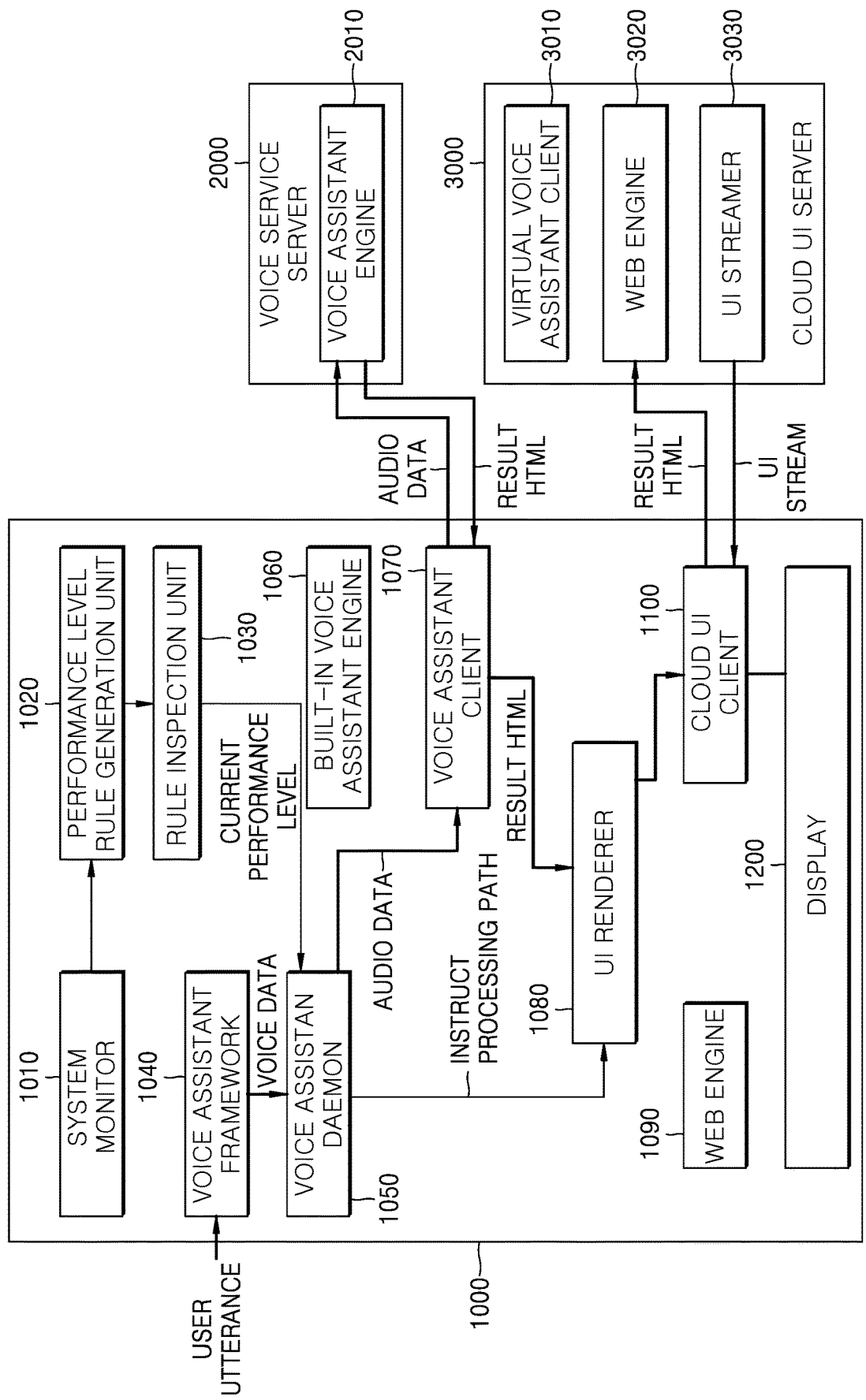

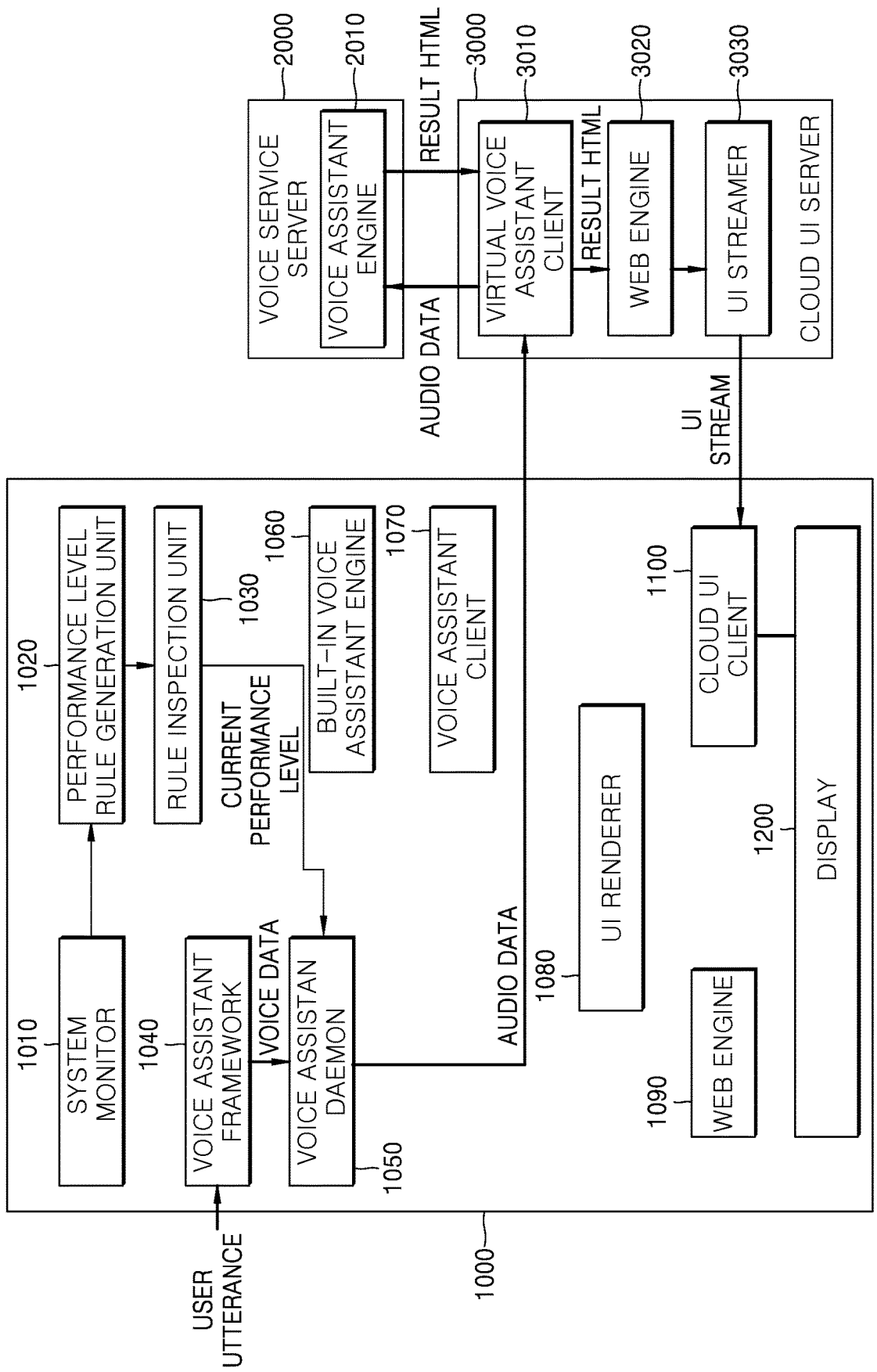

FIG. 14

| CPU load | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| DDR load | | | | | | | | | | | |
| 0 | idle | idle | idle | idle | idle | idle | idle | idle | idle | idle | idle |
| 0.1 | idle | idle | idle | idle | idle | idle | idle | idle | low | low | high |
| 0.2 | idle | idle | idle | idle | idle | low | low | low | low | high | high |
| 0.3 | idle | idle | idle | idle | low | low | low | high | high | high | critical |
| 0.4 | idle | idle | low | low | low | low | high | high | high | high | critical |
| 0.5 | idle | low | low | low | low | high | high | high | critical | critical | critical |
| 0.6 | idle | low | low | high | high | high | high | critical | critical | critical | critical |
| 0.7 | idle | low | high | high | high | high | critical | critical | critical | critical | critical |
| 0.8 | idle | high | high | high | critical | critical | critical | critical | critical | critical | critical |
| 0.9 | idle | high | high | critical | critical | critical | critical | critical | critical | critical | critical |
| 1 | idle | high | high | critical | critical | critical | critical | critical | critical | critical | critical |

PERFORMANCE STATE INFORMATION

PERFORMANCE LEVEL RULE

3000

METHOD AND APPARATUS FOR PROVIDING VOICE ASSISTANT SERVICE

CROSS-REFERENCE TO RELATED APPLICATIONS

This application is a continuation of International Application PCT/KR2023/002305, filed Feb. 16, 2023, and claims foreign priority to Korean application 10-2022-0020395, filed Feb. 16, 2022, the disclosures of which are incorporated herein by reference in their entireties.

BACKGROUND

1. Field

The disclosure relates to an electronic device and method for providing a voice support service.

2. Description of Related Art

Electronic devices, such as computers, smartphones, tablet personal computers (PC), personal digital assistants (PDA), and the like, have been closely used by users. As electronic devices personally used by users have been widely distributed and used, electronic devices have been developed to provide various functions or services to users. Recently, a variety of voice assistant services based on voice recognition technology in electronic devices have been developed and provided. For example, an electronic device may provide a broad range of life convenience services, such as mobile search, schedule management, phone calls, memos, or music playback.

As the number of functions or services provided by a single device has increased, requirements for system resources have increased from day to day. For example, resources for operating a service, such as a central processing unit (CPU) and random-access memory (RAM), are continually required. When, due to a system load, a delay occurs in a function or a service provided by an electronic device, a critical error in usability may be caused. In particular, in the case of a voice assistant service, users expect instant responses, and thus, even a small degradation in performance may drastically decrease user satisfaction, compared to other services. Therefore, a method of providing a service without a delay, according to system performance, is required.

SUMMARY

Aspects will be set forth in part in the description which follows and, in part, will be apparent from the description, or may be learned by practice of the presented embodiments.

A method, performed by an electronic device, of providing a voice assistant service includes: obtaining voice data including an input of a voice of a user; according to a performance level based on performance state information of the electronic device, identifying a processing path for obtaining a response corresponding to the voice of the user and processing a user interface (UI) corresponding to the response; and based on the identified processing path, performing control operations to process the voice data and obtain and output the processed UI.

The performance state information of the electronic device may include at least one of an amount of processor use, an amount of memory use, an input and output speed of a storage, or a transmission and reception speed of a network, with respect to the electronic device.

The performance state information of the electronic device may be obtained by monitoring, in real time, a performance state of the electronic device.

The identifying of the processing path may include: obtaining, based on the performance state information of the electronic device, a rule for identifying the performance level; identifying the performance level based on the obtained rule and the performance state information; and identifying the processing path based on the identified performance level.

The obtaining of the rule may include: training an artificial intelligence (AI) model by using the performance state information of the electronic device; and obtaining, by using the trained AI model, the rule for identifying the performance level.

The identifying of the processing path may include: identifying the processing path such that the response corresponding to the voice of the user is obtained by the electronic device, when the performance level is lower than a first reference level; and identifying the processing path such that the response corresponding to the voice of the user is obtained by a voice service server, when the performance level is higher than or equal to the first reference level.

The performing of the control operations to process the voice data may include, when the processing path is identified such that the response corresponding to the voice of the user is obtained by the voice service server, transmitting the voice data to the voice service server.

The identifying of the processing path may include: identifying the processing path such that the UI is processed by the electronic device, when the performance level is lower than a second reference level; and identifying the processing path such that the UI is processed by a cloud server, when the performance level is higher than or equal to the second reference level.

The performing of the control operations to obtain and output the processed UI may include, when the processing path is identified such that the UI is processed by the cloud server, receiving, from the cloud server, video streaming including the processed UI.

The performance level may be identified as one of a first level, a second level, a third level, and a fourth level, and the performing of the control operations to process the voice data and obtain and output the processed UI may include: when the performance level is identified as the first level, performing the control operations to: obtain the response corresponding to the voice of the user; and process and output the UI corresponding to the response; when the performance level is identified as the second level, performing the control operations to: request a voice service server to obtain the response corresponding to the voice of the user; receive, from the voice service server, the obtained response; and process and output the UI corresponding to the received response; when the performance level is identified as the third level, performing the control operations to: request the voice service server to obtain the response corresponding to the voice of the user; and receive and output the UI corresponding to the obtained response, the UI being processed by a cloud server; and when the performance level is identified as the fourth level, performing the control operations to: transmit the voice data to the cloud server; and receive and output the UI corresponding to the obtained response, the UI being processed by the cloud server.

An electronic device for providing a voice assistant service includes:

a memory storing instructions; and at least one processor functionally integrated with the memory. The at least one processor may be configured to execute the instructions to: obtain voice data including an input of a voice of a user; according to a performance level based on performance state information of the electronic device, identify a processing path for obtaining a response corresponding to the voice of the user and processing a user interface (UI) corresponding to the response; and based on the identified processing path, perform control operations to process the voice data and obtain and output the processed UI.

The performance state information of the electronic device may include at least one of an amount of processor use, an amount of memory use, an input and output speed of a storage, or a transmission and reception speed of a network, with respect to the electronic device.

The at least one processor may further be configured to execute the instructions to obtain the performance state information of the electronic device by monitoring, in real time, a performance state of the electronic device.

The at least one processor may further be configured to execute the instructions to: obtain, based on the performance state information of the electronic device, a rule for identifying the performance level; identify the performance level based on the obtained rule and the performance state information; and identify the processing path based on the identified performance level.

The at least one processor may further be configured to execute the instructions to: train an artificial intelligence (AI) model by using the performance state information of the electronic device; and obtain, by using the trained AI model, the rule for identifying the performance level.

The at least one processor may further be configured to execute the instructions to: identify the processing path such that the response corresponding to the voice of the user is obtained by the electronic device, when the performance level is lower than a first reference level; and identify the processing path such that the response corresponding to the voice of the user is obtained by a voice service server, when the performance level is higher than or equal to the first reference level.

The at least one processor may further be configured to execute the instructions to, when the processing path is identified such that the response corresponding to the voice of the user is obtained by the voice service server, transmit the voice data to the voice service server.

The at least one processor may further be configured to execute the instructions to: identify the processing path such that the UI is processed by the electronic device, when the performance level is lower than a second reference level; and identify the processing path such that the UI is processed by a cloud server, when the performance level is higher than or equal to the second reference level.

The at least one processor may further be configured to execute the instructions to, when the processing path is identified such that the UI is processed by the cloud server, receive, from the cloud server, video streaming including the processed UI.

The performance level may be identified as one of a first level, a second level, a third level, and a fourth level, and the at least one processor may further be configured to execute the instructions to: when the performance level is identified as the first level, perform the control operations to: obtain the response corresponding to the voice of the user; and process and output the UI corresponding to the response; when the performance level is identified as the second level, perform the control operations to: request a voice service server to obtain the response corresponding to the voice of the user; receive, from the voice service server, the obtained response; and process and output the UI corresponding to the received response; when the performance level is identified as the third level, perform the control operations to: request the voice service server to obtain the response corresponding to the voice of the user; and receive and output the UI corresponding to the obtained response, the UI being processed by a cloud server; and when the performance level is identified as the fourth level, perform the control operations to: transmit the voice data to the cloud server; and receive and output the UI corresponding to the obtained response, the UI being processed by the cloud server.

BRIEF DESCRIPTION OF DRAWINGS

Aspects, features, and advantages of certain embodiments of the disclosure will be more apparent from the following description taken in conjunction with the accompanying drawings, in which:

FIG. 11 is a diagram for describing an operation of a system for providing a voice assistant service when a performance condition of an electronic device is normal, according to an embodiment of the disclosure.

FIG. 12 is a diagram for describing an operation of a system for providing a voice assistant service when a performance condition of an electronic device is bad, according to an embodiment of the disclosure.

FIG. 13 is a diagram for describing an operation of a system for providing a voice assistant service when a performance condition of an electronic device is very bad, according to an embodiment of the disclosure.

FIG. 14 is a diagram of a performance rule table according to an embodiment of the disclosure.

DETAILED DESCRIPTION

Figure 1:
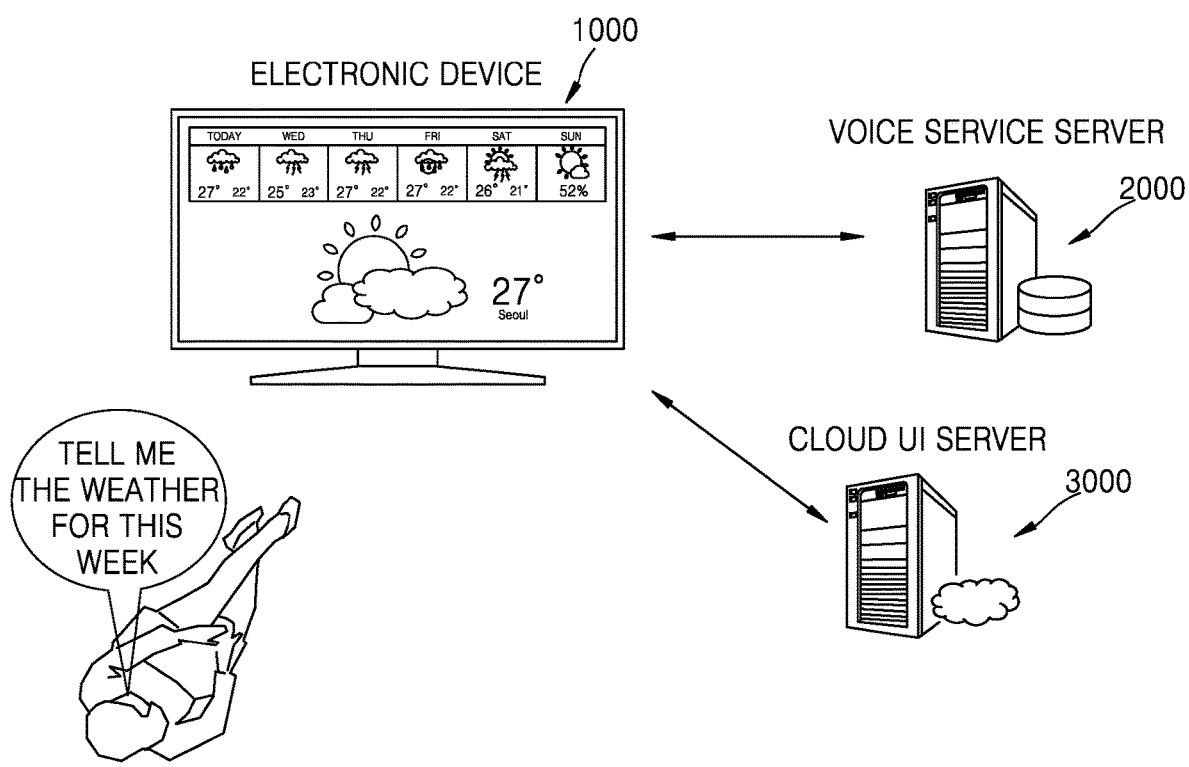
FIG. 1 is a conceptual diagram of a system for providing a voice assistant service according to various embodiments of the disclosure.

Throughout the disclosure, the expression "at least one of a, b or c" indicates only a, only b, only c, both a and b, both a and c, both b and c, all of a, b, and c, or variations thereof.

Hereinafter, various embodiments of the disclosure are described with reference to the accompanying drawings.

Terms used in this specification are used only for describing particular embodiments of the disclosure and may not be intended to limit the scope of other embodiments of the disclosure. An expression used in the singular may encompass the expression in the plural, unless it has a clearly different meaning in the context. Terms used herein, including technical or scientific terms, may have the same meaning as commonly understood by one of ordinary skill in the art described in the disclosure. Terms defined in general dictionaries from among the terms used in this specification may be interpreted as the same or substantially the same meaning as the meaning in the context of the art and may not be interpreted as ideal or excessively formal meanings unless overtly defined so in this specification. According to cases, terms may not be interpreted to exclude the embodiments of the disclosure in this specification, even if the terms are defined in this specification An electronic device according to various embodiments of the disclosure may include, for example, at least one of a smartphone, a tablet personal computer (PC), a mobile phone, a display phone, an electronic book (e-book) reader, a desktop PC, a laptop PC, a netbook computer, a workstation, a server, a personal digital assistant (PDA), a portable multimedia player (PMP), an MPEG audio layer 3 (MP3) player, a mobile medical device, a camera, or a wearable device. According to various embodiments of the disclosure, a wearable device may include at least one of an accessory type (for example, a watch, a ring, a bracelet, an anklet, a necklace, glasses, contact lenses, an earphone, a headphone, or a head-mounted-device (HMD)), a fabric or clothing-integral-type (for example, electronic clothing), a body-attached type (for example, a skin pad or tattoos), or a bio-implant type (for example, an implantable circuit).

In some embodiments of the disclosure, an electronic device may be a home appliance. A home appliance may include, for example, at least one of a television (TV), a digital video disk (DVD) player, an audio player, a refrigerator, an air conditioner, a cleaner, an oven, a microwave oven, a laundry machine, an air cleaner, a set-top box, a home automation control panel, a security control panel, a TV box (for example, Samsung Home Sync™, Apple TV™, or Google TV™), a game console (for example, Xbox™ or PlayStation™), an electronic dictionary, an electronic key, a camcorder, or an electronic frame.

According to another embodiment of the disclosure, an electronic device may include at least one of various medical devices (for example, various portable medical measuring devices (a blood sugar measuring device, a heart rate measuring device, a blood pressure measuring device, a body temperature measuring device, or the like), a magnetic resonance angiography (MRA) machine, a magnetic resonance imaging (MRI) machine, a computed tomography (CT) machine, a capturing device, a ultrasonic device, or the like), a navigation device, a global navigation satellite system (GNSS), an event data recorder (EDR), a flight data recorder (FDR), an automobile infotainment device, vessel's electronic equipment (for example, a vessel's navigation device, a gyrocompass, or the like), an aviation electronic device (avionics), a security device, a vehicle head unit, an industrial or household robot, an automatic teller's machine (ATM) of financial institutions, a point-of-sale (POS) terminal of stores, or an Internet of things (IoT) device (for example, a bulb, various sensors, an electricity or gas meter, a sprinkler device, a fire alarm device, a thermostat, a streetlight, a toaster, an exercise machine, a hot water tank, a heater, a boiler, or the like).

In some embodiments of the disclosure, an electronic device may include at least one of a part of furniture or a building/structure, an electronic board, an electronic signature receiving device, a projector, or various measuring devices (for example, a water, electricity, gas, or radio signal gauge, etc.).

According to various embodiments of the disclosure, an electronic device may be one or a combination of the variety of described devices. An electronic device according to some embodiments of the disclosure may be a flexible electronic device. Also, an electronic device according to an embodiment of the disclosure is not limited to the described devices and may include new devices in compliance with the development of technologies.

An artificial intelligence (AI) system is a computer system with human level intelligence, and unlike a previous rule-based smart system, the AI system is a system that trains itself, decides, and becomes increasingly smarter. The more the AI system is used, the higher the recognition rate of the AI system and the AI system may more accurately understand the user's taste. Thus, the previous rule-based smart system has been gradually replaced by a deep learning-based AI system.

AI technologies are composed of machine learning (deep learning) technologies using an algorithm that classifies/learns characteristics of input data on its own and element technologies simulating functions of the human brain, such as recognition, determination, etc., by using machine learning algorithms.

The machine learning is an algorithm technology that classifies/learns characteristics of input data on its own. The element technologies may include, for example, at least one of linguistic understanding for recognizing human languages/characters, visual comprehension for recognizing objects like the human sight, inference/prediction for logical inference and prediction based on information determination, knowledge representation for processing human experience information as knowledge data, or operation control for controlling autonomous driving of a vehicle and a motion of a robot. The linguistic understanding is a technology to recognize and apply/process human language/characters and includes processing of natural language, machine translation, a conversation system, query response, speech recognition/synthesis, etc.

Functions related to AI according to the disclosure may be operated through a processor and a memory. The processor may include one or more processors. Here, the one or more processors may include a universal processor such as a central processing unit (CPU), an application processor (AP), a digital signal processor (DSP), etc., a dedicated graphic processor such as a graphics processing unit (GPU), a vision processing unit (VPU), etc., or a dedicated AI processor such as a neural processing unit (NPU). The one or more processors may perform a control operation to process input data according to a predefined operation rule stored in a memory or an AI model. Alternatively, when the one or more processors are dedicated AI processors, the dedicated AI processors may be designed to have hardware structures specialized for processing specific AI models.

The predefined operation rule or the AI model may be made by training. Specifically, the predefined operation rule or the AI model being made by training refers to the predefined operation rule or the AI model established to perform a desired feature (or an object) being made when a basic AI model is trained by a learning algorithm with a lot of training data. This learning operation may be directly performed by a device configured to execute the AI function according to the disclosure or may be performed by an additional server and/or an additional system. Examples of the learning algorithm may include supervised learning, unsupervised learning, semi-supervised learning, or reinforcement learning, without being limited thereto.

The AI model may include a plurality of neural network layers. Each of the plurality of neural network layers may have a plurality of weight values, and perform neural network operation through operation between an operation result of the previous layer and the plurality of weight values. The plurality of weight values of the plurality of neural network layers may be optimized by training results of the AI model. For example, the plurality of weight values may be updated to reduce or minimize a loss value or a cost value obtained by the AI model during a training procedure. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, without being limited thereto.

A technical problem to be solved by the disclosure is to provide a method of improving response performance of a voice assistant service by dynamically changing a processing path of the voice assistant service according to a state of system performance of an electronic device.

According to an electronic device and an operating method thereof according to described embodiments of the disclosure, response performance of a voice assistant service may be improved by dynamically changing a processing path of the voice assistant service according to a state of system performance of the electronic device.

FIG. 1 is a conceptual diagram of a system for providing a voice assistant service according to various embodiments of the disclosure.

Referring to FIG. 1, the system for providing the voice assistant service may include an electronic device 1000, a voice service server 2000, and a cloud user interface (UI) server 3000.

The electronic device 1000 according to an embodiment of the disclosure, which corresponds to a computing device capable of providing various functions or services, may be realized in various forms, such as a TV, a digital TV (or a smart TV), a set-top box (STB), a cellular phone, a tablet PC, a content playing device, a digital camera, a camcorder, a laptop computer, a desktop computer, an e-book terminal, a digital broadcasting terminal, a PDA, a PMP, a navigation device, an MP3 player, a wearable device, a watch, etc. Also, the electronic device 1000 according to an embodiment of the disclosure may be a digital appliance (DA), such as a refrigerator, an air cleaner, a laundry machine, a drier, a cleaner, a heater, a watch, an alarm device, etc. Also, the electronic device 1000 may be a fixed-type electronic device arranged in a fixed location, a mobile electronic device in a portable form, or a digital broadcasting receiver capable of receiving digital broadcasting.

The electronic device 1000 may provide various functions or services, such as a content provision function, a video playing function, a game function, etc., to a user. According to various embodiments of the disclosure, the electronic device 1000 may provide various voice recognition services based on voice recognition technologies. For example, the electronic device 1000 may provide a range of life convenience services, such as searching, schedule management, making a phone call, memos, playing music, or the like, based on a voice command of a user.

According to various embodiments of the disclosure, the electronic device 1000 may receive voice data including a voice input of a user. According to various embodiments of the disclosure, the electronic device 1000 may recognize a voice command from the voice data and obtain a response corresponding to the voice command. According to an embodiment of the disclosure, the electronic device 1000 may determine a function requested by the voice command of the user and execute an application for performing the corresponding function. For example, the electronic device 1000 may recognize the voice command of the user requesting a search with respect to a keyword, search for the corresponding keyword in compliance with the recognized voice command, and display a result of the searching. For example, the electronic device 1000 may recognize the voice command of the user requesting music playing and play music in compliance with the recognized voice command.

According to an embodiment of the disclosure, the electronic device 1000 may recognize the voice command from the voice data by using a built-in voice assistant service engine and obtain a response corresponding to the voice command. According to another embodiment of the disclosure, the electronic device 1000 may transmit the voice data to the voice service server 2000 and receive a response obtained from the voice service server 2000. According to another embodiment of the disclosure, the electronic device 1000 may recognize the voice command from the voice data, transmit the recognized voice command to the voice service server 2000, and receive a response obtained from the voice service server 2000.

According to an embodiment of the disclosure, the electronic device 1000 may process and display a UI corresponding to the response corresponding to the voice of the user, by using a built-in UI renderer. The UI may be configured to execute a function requested by the voice command of the user or visually display a result of the response corresponding to the voice command of the user. According to another embodiment of the disclosure, rather than directly processing the UI, the electronic device 1000 display the UI by receiving, from the cloud UI server 3000, the UI processed by the cloud UI server 3000.

The voice service server 2000 may be configured to provide a voice assistant service to the electronic device 1000. According to various embodiments of the disclosure, the voice service server 2000 may receive voice data from the electronic device 1000 and recognize a voice command of a user included in the voice data. According to various embodiments of the disclosure, the voice service server 2000 may obtain a response corresponding to the voice command of the user. Here, the voice command of the user may be generated by the voice service server 2000 or obtained from the electronic device 1000.

The cloud UI server 3000 may be configured to cloud-stream a UI to the electronic device 1000. The cloud UI server 3000 may drive an application and a service and transmit a result screen thereof to the electronic device 1000 in real time, so that a user may be provided with a use environment in which the user may feel that the user uses an application through his or her own electronic device 1000.

According to an embodiment of the disclosure, the cloud UI server 3000 may receive, from the electronic device 1000, response information with respect to a voice of the user. According to another embodiment of the disclosure, the cloud UI server 3000 may receive, from the voice service server 2000, the response information with respect to the voice of the user. According to various embodiments of the disclosure, the cloud UI server 3000 may process a UI corresponding to a received response and stream the processed UI to the electronic device 1000.

The electronic device 1000, the voice service server 2000, and the cloud UI server 3000 may be connected to one another via a network. The network may include a local area network (LAN), a wide area network (WAN), a value added network (VAN), a mobile radio communication network, a satellite communication network, and a combination thereof. Also, the network may be a comprehensive data communication network for enabling seamless communication among the network entities illustrated in FIG. 1 and may include the wired Internet, the wireless Internet, and a mobile radio communication network.

The radio communication may include, for example, Wi-Fi, Bluetooth, Bluetooth low energy (BLE), Zigbee, Wi-Fi direct (WFD), ultra wideband (UWB), infrared data association (IrDA), near field communication (NFC), etc., but is not limited thereto.

For example, FIG. 1 illustrates a case in which the electronic device 1000, the voice service server 2000, and cloud UI server 3000 are separate devices that are differently identified from each other. However, the disclosure is not necessarily limited thereto. The electronic device 1000, the voice service server 2000, and the cloud UI server 3000 may be physically separate devices, logically separate operating entities in the same physical device, or completely the same device.

Also, for example, FIG. 1 illustrates that the electronic device 1000, the voice service server 2000, and cloud UI server 3000 are each provided as a single device. However, the disclosure is not necessarily limited thereto. Each of the electronic device 1000, the voice service server 2000, and the cloud UI server 3000 may be a set of one or more physically separate devices that are functionally connected to perform the operations described above.

For example, the operations of the voice service server 2000, the operations including recognizing the voice command from the voice data and obtaining the response corresponding to the voice command, may be performed via separate servers. For example, a sound-to-text (STT) server configured to perform an STT function of converting voice data into text may be provided, and separately, a server configured to perform a function of recognizing content of a command from the data processed by the STT server and obtaining a response corresponding to the command may be provided.

Figure 2:
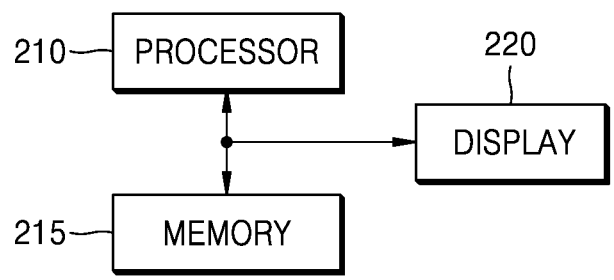
FIG. 2 is a block diagram of an electronic device according to various embodiments of the disclosure.

FIG. 2 is a block diagram of the electronic device 1000 according to various embodiments of the disclosure. The electronic device 1000 illustrated in FIG. 2 may correspond to the electronic device 1000 described with reference to FIG. 1. Thus, descriptions that are the same as in FIG. 1 are omitted.

Referring to FIG. 2, the electronic device 1000 may be a display apparatus that includes a display 220 and visually displays image data. The electronic device 1000 may include a memory 215 storing at least one instruction, a processor 210 executing the at least one instruction, and the display 220.

For example, the electronic device 1000 may include the display 220 and display at least one piece of content. For example, the electronic device 1000 may be provided in various forms, such as a TV, a digital TV, a digital broadcasting terminal, a tablet PC, a smartphone, a mobile phone, a computer, a laptop computer, etc. Here, the digital TV may also be referred to as a smart TV.

For example, the processor 210 may execute at least one instruction to perform a control operation such that a desired operation is performed. Here, the at least one instruction may be stored in a built-in memory (not shown) included in the processor 210 or may be included in the memory 215 included in the electronic device 1000, separately from the processor 210.

In detail, the processor 210 may execute the at least one instruction to control one or more components included in the electronic device 1000 to perform a desired operation. Thus, even if an example is described, in which the processor 210 performs certain operations, it may denote that the processor 210 controls one or more components included in the electronic device 1000 to perform certain operations.

Also, although a case in which the processor 210 is provided as a single processor is described and illustrated as an example, the processor 210 may also be provided as a plurality of processors.

For example, the processor 210 may include random-access memory (RAM) (not shown) storing a signal or data that is input from the outside of the electronic device 1000 or used as a storage corresponding to various operations performed by the electronic device 1000, read-only memory (ROM) (not shown) storing a control program for controlling the electronic device 1000, an application for providing certain functions or services, and/or a plurality of instructions, and at least one processor (not shown). The processor 210 may include a GPU (not shown) for processing graphics corresponding to video data. The processor 210 may be realized as a system on chip (SoC) combining a core (not shown) and a GPU. Also, the processor 210 may include a multi-core including more cores than a single-core. For example, the processor 210 may include a dual core, a triple core, a quad core, a hexa core, an octa core, a deca core, a dodeca core, a hexadecimal core, and the like.

The memory 215 may store at least one instruction, data, information, and/or applications. For example, the memory 215 may store the at least one instruction executed by the processor 210. For example, the memory 215 may store at least one program executed by the processor 210. For example, the memory 215 may store an application for providing a certain service.

For example, the memory 215 may include at least one type of storage medium from among a flash memory type, a hard disk type, a multimedia card micro type, a card-type memory (for example, an SD memory or an XD memory), RAM, static RAM (SRAM), ROM, electrically erasable programmable ROM (EEPROM), programmable ROM (PROM), a magnetic memory, a magnetic disk, and an optical disk.

According to an embodiment of the disclosure, the processor 210 of the electronic device 1000 may execute at least one instruction to control operations below to be performed. According to various embodiments of the disclosure, the processor 210 may obtain voice data including an input of a voice of a user. According to various embodiments of the disclosure, the processor 210 may identify a processing path for obtaining a response corresponding to the voice of the user and processing a UI corresponding to the response, according to a performance level based on performance state information of the electronic device 1000. According to various embodiments of the disclosure, based on the identified processing path, the processor 210 may perform control operations to process the voice data and obtain and display the processed UI. For example, based on the identified processing path, the processor 210 may perform the control operation such that the response corresponding to the voice of the user is obtained by the electronic device 1000 or by the voice service server 2000. For example, based on the identified processing path, the processor 210 may perform the control operation such that the UI corresponding to the response is processed by the electronic device 1000 or by the cloud UI server 3000.

The display 220 may display an image on a screen according to control by the processor 210. For example, the processor 210 may control the display 220 to display a desired image on the display 220.

The display 220 may display an image on the screen. For example, the display 220 may display an image corresponding to video data, through a display panel (not shown) included therein, so that a user may visually recognize the video data. According to various embodiments of the disclosure, the display 220 may display a rendered UI on the screen according to control by the processor 210.

Figure 3:
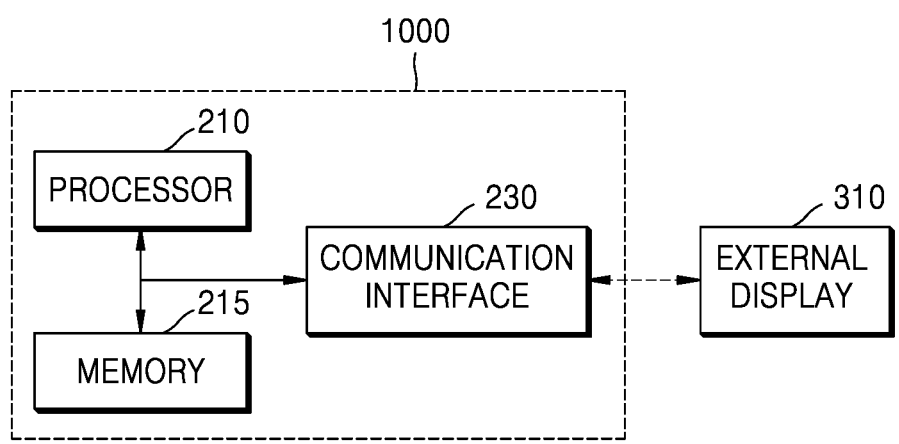
FIG. 3 is another block diagram of an electronic device according to various embodiments of the disclosure.

FIG. 3 is another block diagram of the electronic device 1000 according to various embodiments of the disclosure. The electronic device 1000 illustrated in FIG. 3 may correspond to the electronic device 1000 described with reference to FIGS. 1 and 2. Also, the components of FIG. 3, which are the same as the components of FIG. 2, are illustrated by using the same reference numerals. Thus, descriptions that are the same as in FIGS. 1 and 2 are omitted.

Referring to FIG. 3, the electronic device 1000 may include the processor 210, the memory 215, and a communication interface 230.

The communication interface 230 may perform communication with at least one external device.

Here, the "communication" may denote an operation of transmitting and/or receiving data, a signal, a request, and/or a command.

The communication interface 230 may perform wired or wireless communication with the at least one external device. For example, the external device may be an external display 410. As another example, the external device (not shown) may be a source device, a server, a storage, etc. that may provide content. Alternatively, the external device (not shown) may be an Internet server, etc. that may provide content. Alternatively, the external device (not shown) may be an electronic device, a server, etc. that may process or provide data.

For example, the communication interface 230 may include at least one of a communication module, a communication circuit, a communication device, an input/output port, or an input/output plug for performing wired or wireless communication with the at least one external device.

For example, the communication interface 230 may include at least one wireless communication module, wireless communication circuit, or wireless communication device performing wireless communication with the external device, for example, a controller.

For example, the communication interface 230 may include a short-range communication module which may receive a control command from a remote controller (not shown) in a short range distance, such as an infrared (IR) communication module, etc. In this case, the communication interface 230 may receive the control signal from the remote controller.

As another example, the communication interface 230 may include at least one communication module (not shown) performing communication according to the wireless communication standards, such as Bluetooth, Wi-Fi, BLE, NFC/radio frequency identification (RFID), WFD, UWB, or Zigbee. Alternatively, the communication interface 230 may further include a communication module (not shown) performing communication with a server (not shown) for assisting remote communication according to the remote communication standards. For example, the communication interface 230 may include a communication module (not shown) performing communication through a network for Internet communication. Also, the communication interface 230 may include a communication module (not shown) performing communication through a communication network according to the communication standards, such as the 3rd generation (3G), the 4th generation (4G), the 5th generation (5G), and/or the 6th generation (6G).

As another example, the communication interface 230 may include at least one port (not shown) to be connected with an external device through a wired cable, so as to communicate with the external device in a wired manner. For example, the communication interface 230 may include at least one of an HDMI port, a component jack, a PC port, or a USB port. Accordingly, the communication interface 230 may perform communication with the external device connected in a wired manner thorough the at least one port (not shown). Here, the port may denote a physical component through or into which a cable, a communication line, a plug, or the like may be connected or inserted.

As described above, the communication interface 230 may include one or more one assistant components for assisting communication between the electronic device 1000 and an external device. Here, the assistant components may include a communication module, a communication circuit, a communication device, a port (for inputting/outputting data), a cable port (for inputting/outputting data), and a plug (for inputting/outputting data) described above. For example, the one or more assistant components included in the communication interface 230 may include an Ethernet communication module, a Wi-Fi communication module, a Bluetooth communication module, an IR communication module, a USB port, a tuner (or a broadcasting receiver), an HDMI port, a display port (DP), a digital visual interface (DVI) port, etc. Alternatively, the one or more assistant components described above may be included in the communication interface 230.

Referring to FIG. 3, a case in which the external device connected to the electronic device 1000 is an external display 310 is illustrated and described as an example. The electronic device 1000 and the external display 310 may be connected to each other in a wired or wireless manner. For example, the electronic device 1000 and the external display 310 may be connected and communicate with each other through an HDMI port included in the communication interface 230. As another example, the electronic device 1000 and the external display 310 may communicate with each other through a Wi-Fi module included in the communication interface 230.

Referring to FIG. 3, the electronic device 1000 may be an electronic device that does not include a display therein. For example, the electronic device 1000 may be an STB. As another example, the electronic device 1000 may be a content provision device or a content playing device.

Alternatively, while the electronic device 1000 may include a display (not shown) therein, the electronic device 1000 may perform a control operation such that the content received by the electronic device 1000 or stored in the electronic device 1000 may be displayed through the external display 310 connected to the electronic device 1000 via the communication interface 230, rather than through the display included in the electronic device 1000. For example, the processor 210 may control the communication interface 230 to transmit, to the external display 310, the content stored in the processor 210 or received through the communication interface 230. For example, the communication interface 230 may transmit the content to the external display 310 according to control by the processor 210. Then, the external display 310 may display the received content through a display panel (not shown) included in the external display 310. Accordingly, a user may visually recognize the content displayed through the external display 310.

Figure 4:
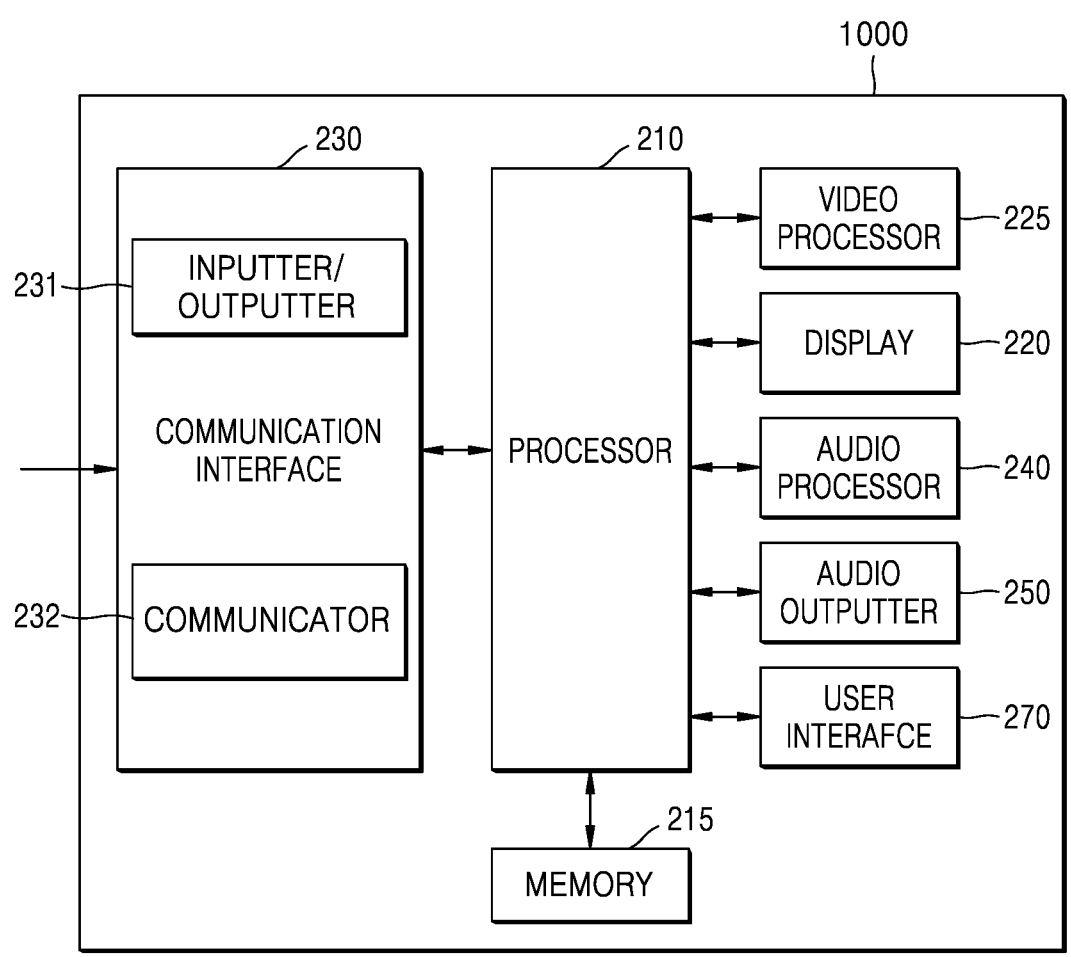
FIG. 4 is another block diagram of an electronic device according to various embodiments of the disclosure.

FIG. 4 is another block diagram of the electronic device 1000 according to various embodiments of the disclosure. Also, the components of FIG. 4, which are the same as the components of FIGS. 2 and 3, are illustrated by using the same reference numerals. The electronic device 1000 illustrated in FIG. 4 may correspond to the electronic device 1000 described with reference to FIGS. 1 through 3. Thus, when describing the electronic device 1000, the descriptions that are the same as in FIGS. 1 through 3 are omitted.

Referring to FIG. 4, compared with the electronic device 1000 illustrated in FIG. 2, the electronic device 1000 may further include at least one of an image processor 220, an audio processor 240, an audio outputter 250, the memory 215, or a user interface 270.

For example, compared with the electronic device 1000 illustrated in FIG. 2, the electronic device 1000 may further include the image processor 225 and the audio processor 240.

Also, compared with the electronic device 1000 illustrated in FIG. 2, the electronic device 1000 may further include the image processor 225, the audio processor 240, and the audio outputter 250. Also, compared with the electronic device 1000 illustrated in FIG. 2, the electronic device 1000 may further include at least one of the memory 215 or the user interface 270.

The communication interface 230 may receive image data and audio data from a source device according to a connected protocol and may output the received image data and audio data to the image processor 225 and the audio processor 240, according to control by the processor 210.

The communication interface 230 may include at least one of at least one communication module or at least one port, transmitting and receiving at least one of data, a signal, or a command to and from an external device (not shown). In detail, the communication interface 230 may include a communicator 232 and an inputter/outputter 231.

The inputter/outputter 231 may include at least one of a module for receiving an input of a signal or data from an external device or a module for outputting (or transmitting) a signal or data to the external device.

For example, the inputter/outputter 231 may include at least one of an HDMI port, a component jack (not shown), a PC port (not shown), a DP, a DVI, a thunderbolt, or a USB port (not shown). Also, the inputter/outputter 231 may include a combination of the HDMI port, the component jack, the PC port, the DP, the DVI, the thunderbolt, and the USB port. For example, the inputter/outputter 231 may directly receive video data (for example, game content) to be played by the electronic device 1000, through the HDMI port, the component jack, the PC port, or the USB port.

For example, the inputter/outputter 231 may be connected with an external display (for example, the external display 310 of FIG. 3) in a wired manner through the HDMI port. As another example, the inputter/outputter 231 may be connected with a source device (not shown) in a wired manner through the HDMI port.

The communicator 232 may perform communication with the external device through at least one wired or wireless communication network. For example, the communicator 232 may communicate with the source device. In detail, the communicator 232 may be provided as a form including at least one communication module, communication circuit, or the like and may transmit and receive data to and from the external device through the communication module and/or the communication circuit.

In detail, the communicator 232 may include at least one communication module (not shown) performing communication according to the communication standards, such as Bluetooth, Wi-Fi, BLE, NFC/RFID, WFD, UWB, Zigbee, or the like. Also, the communicator 232 may include a communication module (not shown) performing communication through a network for Internet communication. Also, the communicator 232 may include a communication network according to the mobile communication standards, such as the 3G, 4G, 5G, and/or 6G.

For example, the communicator 232 may include a communication module (for example, an IR communication module, etc.), which may receive a control signal or a control command from a remote controller (not shown) in a short range distance. In this case, the communicator 232 may receive the control signal or the control command from the remote controller. For example, the control command may be received in the form of audio data corresponding to a voice control function to be described below.

For example, the remote controller communicating with the electronic device 1000 may include a microphone for receiving a voice from the user. In detail, the remote controller may receive the voice of the user through a built-in microphone, in order to provide a voice control function to the user. In this case, the remote controller may transmit audio data corresponding to the received voice to the data communicator 232. Then, the communicator 232 may receive the audio data from the remote controller. For example, the audio data may correspond to a voice command of the user and may have the form of a digital signal or an analog signal. For example, the audio data may be received through a Bluetooth module or a Wi-Fi module. With respect to the example described above, based on the received audio data, the processor 210 may control the electronic device 1000 to perform an operation corresponding to the received audio data.

As another example, as an external device for controlling the electronic device 1000, a remote controller or a mobile device (for example, a terminal in which a voice recognition application is installed, etc., such as a smart phone, an AI speaker, etc.) may be provided. For example, the electronic device 1000 and the mobile device may transmit and receive data to and from each other through an IR module, a Bluetooth module, a Wi-Fi module, or the like included in the communicator 232. When the electronic device 1000 communicates with the mobile device, a user may input a voice through a microphone equipped in a smartphone. The smartphone may transmit audio data corresponding to the received voice to the communicator 232. With respect to the example described above, based on the audio data received through the communicator 232, the processor 210 may control the electronic device 1000 to perform an operation corresponding to the received audio data.

The image processor 225 may process image data corresponding to content and output the image data to the display 220, according to control by the processor 210. For example, the image processor 225 may process the image data corresponding to the content received through the communication interface 230 and output the image data to the display 220, according to control by the processor 210.

For example, the image processor 225 may decode the image data corresponding to the content, generate the image data to be displayed on the display 220, and transmit the generated image data to the display 220, according to control by the processor 210.

As another example, the image processor 225 may generate a user interface screen according to control by the processor 210.

The display 220 may display, on a screen, the image data received from the image processor 225. For example, the display 220 may output a UI corresponding to a voice of the user.

The audio processor 240 may convert the audio data received from the communication interface 230 into analog audio data and output the analog audio data to the audio outputter 250, according to control by the processor 210.

The audio outputter 250 may output the received analog audio data through a speaker.

The memory 215 may store programs related to an operation of the electronic device 1000 and various data generated during the operation of the electronic device 1000. Alternatively, the memory 215 may store content received from an external device. Alternatively, the memory 215 may store data or information required for an operation of the electronic device 1000.

The memory 215 may include at least one memory. Here, the at least one memory may include at least one type of storage medium from among a flash memory type, a hard disk type, a multimedia card micro type, a card-type memory (for example, an SD memory or an XD memory), RAM, SRAM, ROM, EEPROM, PROM, a magnetic memory, a magnetic disk, and an optical disk.

The user interface 270 may receive a user input for controlling the electronic device 1000. The user interface 270 may include, but is not limited to, a user input device including a touch panel configured to sense a user's touch, a button configured to receive user's push manipulation, a wheel configured to receive user's rotation manipulation, a keyboard, a dome switch, and the like.

Also, the user interface 270 may include a voice recognition device (not shown) configured for voice recognition. For example, the voice recognition device may include a microphone, and the voice recognition device may receive a user's voice command or voice request. As a result, the processor 210 may perform a control operation such that an operation corresponding to the voice command or the voice request may be performed.

Also, the user interface 270 may include a motion sensing sensor (not shown). For example, the motion sensing sensor may sense a motion of the electronic device 1000 and receive the sensed motion as a user input. Also, the voice recognition device (for example, a microphone) and the motion sensing sensor described above may not be included in the user interface 270. Rather, the voice recognition device and the motion sensing sensor may be included in the electronic device 1000 as modules that are separate from the user interface 270.

Figure 5:
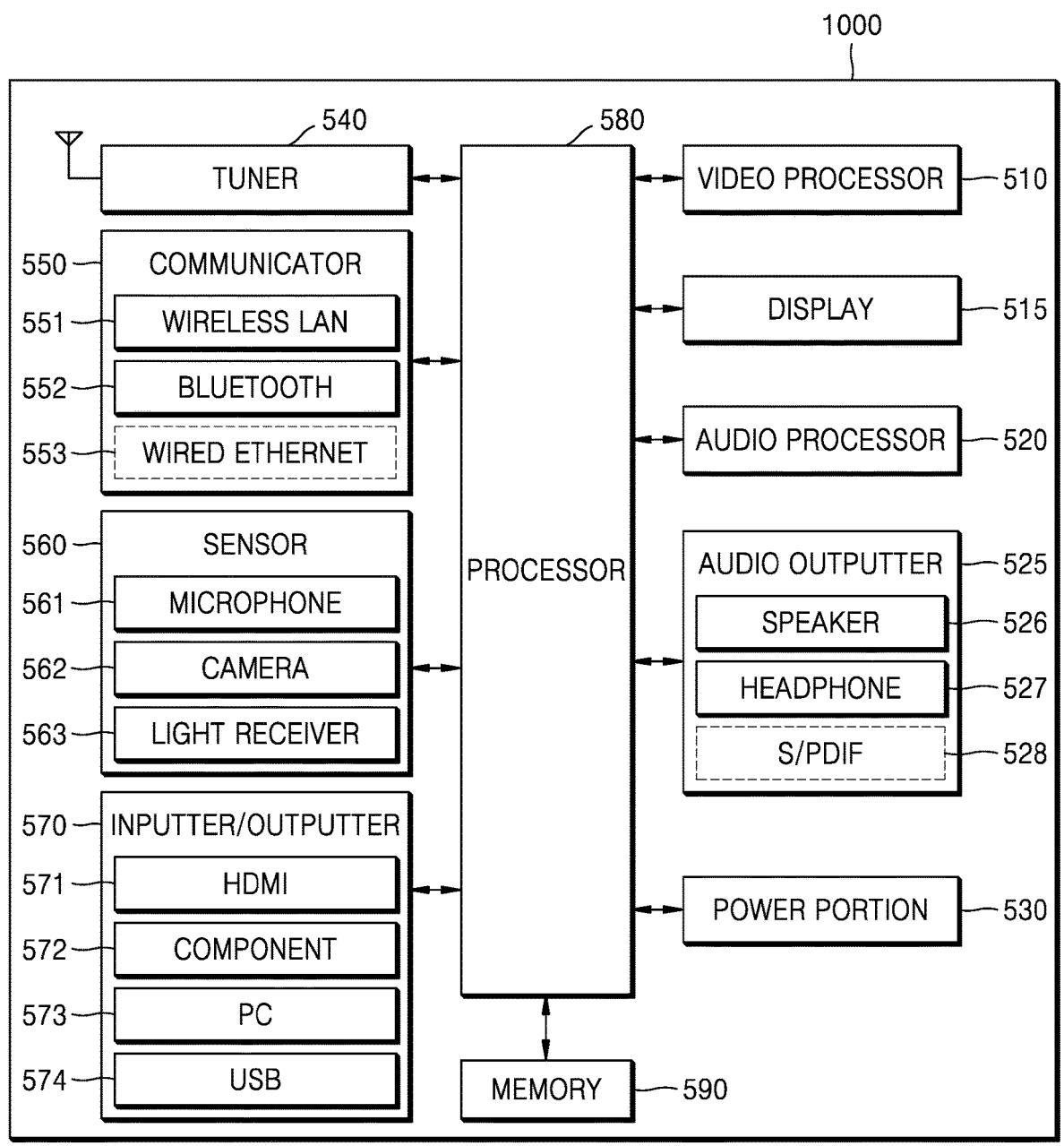
FIG. 5 is another block diagram of an electronic device according to various embodiments of the disclosure.

FIG. 5 is another block diagram of the electronic device 1000 according to various embodiments of the disclosure. The electronic device 1000 illustrated in FIG. 5 may correspond to the electronic device 1000 illustrated in FIGS. 1 through 4. Thus, when describing the electronic device 1000, the descriptions that are the same as in FIGS. 1 through 4 are omitted.

Referring to FIG. 5, the electronic device 1000 may include a video processor 510, a display 515, an audio processor 520, an audio outputter 525, a power portion 530, a tuner 540, a communicator 550, a sensor 560, an inputter/outputter 570, a processor 580, and a memory 590.

The communicator 550, the display 510, the inputter/outputter 570, the processor 580, the video processor 510, the audio processor 520, the audio outputter 525, and the memory 590 of the electronic device 1000 may respectively correspond to the communicator 232, the display 220, the inputter/outputter 231, the processor 210, the image processor 225, the audio processor 240, the audio outputter 250, and the memory 215 illustrated and described with reference to FIGS. 2 through 4. Thus, when describing the electronic device 1000, the descriptions that are the same as in FIGS. 2 through 4 are omitted.

The video processor 510 may process video data received by the electronic device 1000. The video processor 510 may perform various image processing operations on the video data, such as decoding, scaling, noise cancelling, frame rate conversion, resolution conversion, etc.

The display 515 may display, on a screen, video included in a broadcasting signal received through the tuner 540, according to control by the processor 580. Also, the display 515 may display content (for example, video) that is input through the communicator 550 or the inputter/outputter 570. Also, the display 515 may output an image stored in the memory 590, according to control by the processor 580.

The audio processor 520 may process audio data. The audio processor 520 may perform various processing operations on the audio data, such as decoding, amplification, noise cancelling, etc. The audio processor 520 may include a plurality of audio processing modules for processing audio data corresponding to a plurality of pieces of content.

The audio outputter 525 may output audio included in a broadcasting signal received through the tuner 540, according to control by the processor 580. The audio outputter 525 may output audio (for example, a voice, sound, etc.) that is input through the communicator 550 or the inputter/outputter 570. Also, the audio outputter 525 may output audio stored in the memory 590, according to control by the processor 580. The audio outputter 525 may include at least one of a speaker 526, a headphone output terminal 527 or a Sony/Philips digital interface (S/PDIF) output terminal 528. The audio outputter 525 may include a combination of the speaker 526, the headphone output terminal 527, and the S/PDIF output terminal 528.

The power portion 530 may supply power that is input from an external power source to the components 510 through 590 of the electronic device 1000, according to control by the processor 580. Also, the power portion 530 may supply power that is output from a battery or two or more batteries (not shown) included in the electronic device 1000 to the built-in components 510 through 590, according to control by the processor 580.

The tuner 540 may tune and select only a frequency of a channel to be received by the electronic device 1000 from among many electro-wave components, through amplification, mixing, resonance, etc. with respect to a broadcasting signal, etc. received in a wired or wireless manner. The broadcasting signals may include audio data, video data, and additional data (for example, an electronic program guide (EPG)).

The tuner 540 may receive the broadcasting signals from a frequency band corresponding to a channel number (for example, a cable broadcasting number 506) according to a control signal received from an external control device (not shown), for example, a remote controller, wherein the control signal includes for example, an input of a channel number, an input of upward or downward scrolls through channels, a channel input on an EPG screen, etc.

The tuner 540 may receive the broadcasting signals from various sources, such as ground wave broadcasting, cable broadcasting, satellite broadcasting, Internet broadcasting, etc. The tuner 540 may receive the broadcasting signals from sources, such as analog broadcasting or digital broadcasting. The broadcasting signals received through the tuner 540 may be decoded (for example, audio-decoded, video-decoded, or additional data-decoded) and divided into audio data, video data and/or additional data. The divided audio, video, and/or additional data may be stored in the memory 590 according to control by the processor 580.

The tuner 540 of the electronic device 1000 may include a single tuner or a plurality of tuners. According to an embodiment of the disclosure, when the tuner 540 includes a plurality of tuners, a plurality of broadcasting signals may be output on a plurality of windows included in a multi-window screen provided on the display 515.

The tuner 540 may be realized as an all-in-one type with the electronic device 1000, as an additional device (for example, an STB (not shown)) having a tuner electrically connected to the electronic device 1000, or as a tuner (not shown) connected to the inputter/outputter 570.

The communicator 550 may connect the electronic device 1000 with an external device (for example, an external camera, a smartphone, an audio device, etc.) according to control by the processor 580. The processor 580 may transmit/receive content to/from the external device connected through the communicator 550, download an application from the external device, or browse the Web. In detail, the communicator 550 may access a network and receive the content from the external device.

As described above, the communicator 550 may include at least one of a short-range wireless communication module (not shown), a wired communication module (not shown), or a mobile communication module (not shown).

FIG. 5 illustrates a case in which the communicator 550 includes one of a wireless LAN 551, a Bluetooth communicator 552, or wired Ethernet 553, as an example.

Also, the communicator 550 may include a module combination including at least one of the wireless LAN 551, the Bluetooth communicator 552, or the wired Ethernet 553. Also, the communicator 550 may receive a control signal of a controller (not shown) according to control by the processor 580. The control signal may be realized as a Bluetooth type, a radio frequency (RF) signal type, or a Wi-Fi type.

The communicator 550 may further include other short-range wireless communication (for example, NFC (not shown) and an additional BLE module (not shown), in addition to Bluetooth.

The sensor 560 may sense a voice, an image, or interaction of a user. According to an embodiment, the sensor 560 may include at least one of a microphone 561, a camera portion 562, or a light receiver 563.

The microphone 561 may receive an uttered voice of the user. The microphone 561 may output the received voice to the processor 580 by converting the received voice into an electrical signal. The user voice may include, for example, a voice corresponding to a menu or a function of the electronic device 1000. For example, a recommended recognition range of the microphone 561 may be within a predetermined distance (for example, about 4 m) from the microphone 561 to a location of the user, and the recognition range of the microphone 561 may be changed based on a volume of the voice of the user or an ambient environment (for example, a speaker sound, an ambient noise, etc.).

The microphone 561 may be realized as an integral type or a separate type with respect to the electronic device 1000. The microphone 561 that is a separate type may be electrically connected to the electronic device 1000 through the communicator 550 or the inputter/outputter 570.

It may be easily understood by one of ordinary skill in the art that the microphone 561 may be excluded according to the performance and the structure of the electronic device 1000.

The camera portion 562 may receive an image (for example, continual frames) corresponding to a motion of the user including a gesture within a camera recognition range. For example, the recognition range of the camera portion 562 may correspond to a distance of about 0.1 m to about 5 m from the camera portion 562 to the user. The motion of the user may include, for example, a body part of the user, such as a face, an expression, a hand, a fist, a finger, etc. of the user, or a motion of the body part of the user. The camera portion 562 may convert the received image into an electrical signal and output the electrical signal to the processor 580 according to control by the processor 580.

The processor 580 may select a menu displayed on the electronic device 1000 by using a result of recognizing the received motion or may perform a control operation corresponding to the result of recognizing the receiving motion. For example, the control operation may include a channel adjustment, a volume adjustment, a cursor movement, etc.

The camera portion 562 may include a lens (not shown) and an image sensor (not shown). The camera portion 562 may support optical zooming or digital zooming, by using a plurality of lenses and image processing. A recognition range of the camera portion 562 may be set in various ways according to an angle of the camera and conditions of an ambient environment. When the camera portion 562 includes a plurality of cameras, a three-dimensional still image or a three-dimensional motion may be received by using the plurality of cameras.

The camera portion 562 may be realized as an integral type or a separate type with respect to the electronic device 1000. An additional device (not shown) including the separate type camera portion 562 may be electrically connected to the electronic device 1000 through the communicator 550 or the inputter/outputter 570.

It may be easily understood by one of ordinary skill in the art that the camera portion 562 may be excluded according to the performance and the structure of the electronic device 1000.

The light receiver 563 may receive an optical signal (including a control signal) from an external controller (not shown) through an optical window (not shown) of a bezel of the display 515. The light receiver 563 may receive the optical signal corresponding to a user input (for example, a touch input, a press input, a touch gesture, a voice, or a motion) from the controller. A control signal may be extracted from the received optical signal according to control by the processor 580.

For example, the light receiver 563 may receive a signal corresponding to a pointing location of a controller (not shown) and transmit the signal to the processor 580. For example, when a user interface screen for receiving data or a command from the user is output through the display 515 and the user is to input the data or the command to the electronic device 1000 through the controller, the light receiver 563 may receive a signal corresponding to a motion of the controller and transmit the signal to the processor 580, when the user moves the controller in a state in which a finger of the user touches a touch pad provided in the controller. Also, the light receiver 563 may receive a signal indicating that a predetermined button provided in the controller is pressed and transmit the signal to the processor 580. For example, when the user presses the touch pad provided in the form of a button in the controller by using a finger, the light receiver 563 may transmit the signal indicating that the button-type touch pad is pressed to the processor 580. For example, the signal indicating that the button-type touch pad is pressed may be used as a signal for selecting one of items.

The inputter/outputter 570 may receive video (for example, a motion picture, etc.), audio (for example, a voice, music, etc.), and additional data (for example, an EPG, etc.) from the outside of the electronic device 1000, according to control by the processor 580. The inputter/outputter 570 may include one of an HDMI port 571, a component jack 572, a PC port 573, or a USB port 574. The inputter/outputter 570 may include a combination of the HDMI port 571, the component jack 572, the PC port 573, and the USB port 574.

It may be easily understood by one of ordinary skill in the art that the structure and the operation of the inputter/outputter 570 may be realized in various ways according to an embodiment of the disclosure.

The processor 580 may control general operations of the electronic device 1000, control signal flows among the built-in components (not shown) of the electronic device 1000, and process data. When there is a user input or a condition predetermined and stored is met, the processor 580 may execute an operation system (OS) or various applications stored in the memory 590.

The processor 580 may include RAM (not shown) storing a signal or data that is input from the outside of the electronic device 1000 or used as a storage corresponding to various operations performed by the electronic device 1000, ROM (not shown) storing a control program for controlling the electronic device 1000, and a processor (not shown).

The processor 580 may include a GPU (not shown) for processing graphics data corresponding to video data. The processor 580 may be realized as an SoC combining a core (not shown) and a GPU. The processor 580 may include a single cord, a dual core, a triple core, a quad core, or its multiple core.

Also, the processor 580 may include a plurality of processors. For example, the processor 580 may be realized as a main processor (not shown) and a sub-processor (not shown) operating in a sleep mode.

The GPU may generate a screen including various objects, such as an icon, an image, text, etc. by using a calculator (not shown) and a renderer (not shown). The calculator may use user interaction that is sensed through the sensor in order to calculate attribute values of each of the objects, such as a coordinate value, a shape, a size, a color, etc., via which the object is to be displayed according to a layout of a screen. The renderer may generate the screen of various layouts including the objects based on the attribute values calculated by the calculator. The screen generated by the renderer may be displayed in a display area of the display 515.

Hereinafter, operations performed by the electronic device 1000 or control operations performed by the electronic device 1000, according to an embodiment of the disclosure, are described in detail by referring to FIGS. 6 through 16.

Figure 6:
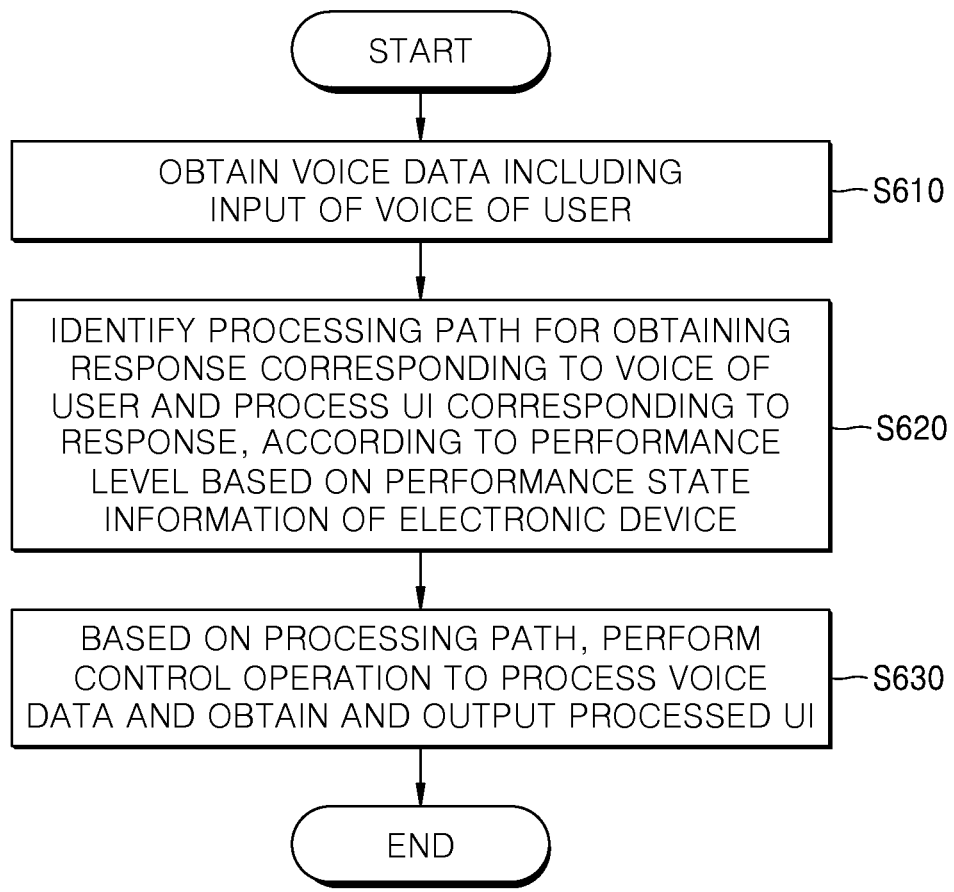
FIG. 6 is a flowchart of a method, performed by an electronic device, of providing a voice assistant service, according to various embodiments of the disclosure.

FIG. 6 is a flowchart of a method, performed by the electronic device 1000, of providing a voice assistant service, according to various embodiments of the disclosure. The operating method of the electronic device 1000 illustrated in FIG. 6 may be performed by the electronic device 1000 or the processor 210 of the electronic device 1000 according to an embodiment of the disclosure described with reference to FIGS. 1 through 5.

Referring to FIG. 6, in operation S610, the electronic device 1000 may obtain voice data including an input of a voice of a user. According to various embodiments of the disclosure, the voice data may include audio data corresponding to a voice command. According to various embodiments of the disclosure, the voice data may have the form of a digital signal or an analog signal.

According to an embodiment of the disclosure, the electronic device 1000 may obtain the voice data through a built-in microphone. According to another embodiment of the disclosure, the electronic device 1000 may receive voice data transmitted from an external device.

In operation S620, according to a performance level based on performance state information of the electronic device 1000, the electronic device 1000 may identify a processing path for obtaining a response corresponding to the voice of the user and processing a UI corresponding to the response.

According to various embodiments of the disclosure, the electronic device 1000 may obtain the performance state information of the electronic device 1000. According to an embodiment of the disclosure, the performance state information may include the amount of resource use or the processing amount per unit time of the electronic device 1000. According to an embodiment of the disclosure, the electronic device 1000 may obtain the performance state information by monitoring a performance state of the electronic device 1000 in real time.

According to various embodiments of the disclosure, the electronic device 1000 may identify the performance level of the electronic device 1000 based on the performance state information. For example, the electronic device 1000 may identify the performance level as one of a first level (good), a second level (normal), a third level (bad), and a fourth level (very bad) based on the performance state information. However, the performance level is not limited to the example above, and the number of performance levels may be arbitrarily configured according to the number of configurable processing paths of the electronic device 1000.

According to various embodiments of the disclosure, based on the identified performance level, the electronic device 1000 may identify the processing path for obtaining the response corresponding to the voice of the user. For example, the electronic device 1000 may identify the processing path such that the response corresponding to the voice of the user is obtained directly by the electronic device 1000 or is obtained by the voice service server 2000.

According to various embodiments of the disclosure, based on the identified performance level, the electronic device 1000 may identify the processing path for processing the UI corresponding to the response. For example, the electronic device 1000 may identify the processing path such that the UI corresponding to the response is processed directly by the electronic device 1000 or is processed by the cloud UI server 3000.

A detailed method, performed by the electronic device 1000, of identifying the processing path according to the performance level based on the performance state information is described in more detail with reference to FIGS. 7 through 16.

In operation S630, based on the processing path, the electronic device 1000 may perform control operations to process the voice data, obtain and output the processed UI.

According to various embodiments of the disclosure, based on the processing path, the electronic device 1000 may perform the control operation such that the response corresponding to the voice of the user is obtained by the electronic device 1000 or by the voice service server 2000. According to an embodiment of the disclosure, the electronic device 1000 may recognize the voice command from the voice data by using a built-in voice assistant service engine and obtain the response corresponding to the voice command. According to another embodiment of the disclosure, the electronic device 1000 may transmit the voice data to the voice service server 2000 and receive the response obtained from the voice service server 2000. According to another embodiment of the disclosure, the electronic device 1000 may recognize the voice command from the voice data, transmit the recognized voice command to the voice service server 2000, and receive the response obtained from the voice service server 2000.

According to various embodiments of the disclosure, based on the processing path, the electronic device 1000 may perform the control operation such that the UI corresponding to the response is processed by the electronic device 1000 or by the cloud UI server 3000. According to an embodiment of the disclosure, the electronic device 1000 may process the UI corresponding to the response corresponding to the voice of the user, by using a built-in UI renderer. According to another embodiment of the disclosure, rather than directly processing the UI, the electronic device 1000 may receive, from the cloud UI server 3000, the UI processed by the cloud UI server 3000.

According to various embodiments of the disclosure, the electronic device 1000 may perform the control operation to output the processed UI. According to an embodiment of the disclosure, the electronic device 1000 may control a display included in the electronic device 1000 to output the processed UI. According to another embodiment of the disclosure, the electronic device 1000 may transmit the processed UI to an external display so that the processed UI may be output by the external display.

Figure 7:
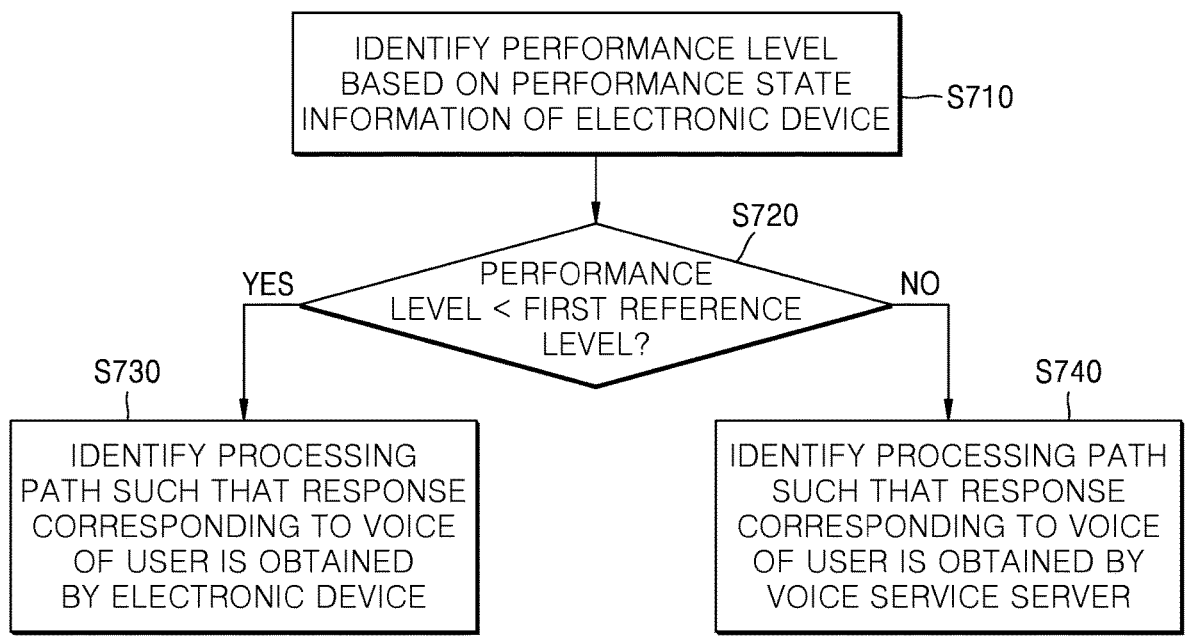
FIG. 7 is a flowchart of a method, performed by an electronic device, of identifying a processing path, according to various embodiments of the disclosure.

FIG. 7 is a flowchart of a method, performed by the electronic device 1000, of identifying a processing path, according to various embodiments of the disclosure. The operating method of the electronic device 1000 illustrated in FIG. 7 may be performed by the electronic device 1000 or the processor 210 of the electronic device 1000 according to an embodiment of the disclosure described with reference to FIGS. 1 through 5. The operations illustrated in FIG. 7 may correspond to operation S620 illustrated in FIG. 6.

Referring to FIG. 7, in operation S710, the electronic device 1000 may identify a performance level of the electronic device 1000 based on performance state information of the electronic device 1000.

According to an embodiment of the disclosure, the electronic device 1000 may identify the performance level based on a predefined rule. For example, based on a predefined rule table, the electronic device 1000 may identify the performance level corresponding to current performance state information.

According to an embodiment of the disclosure, the electronic device 1000 may obtain a rule for identifying the performance level, based on the performance state information, and may identify the performance level based on the rule and the performance state information. For example, the electronic device 1000 may obtain a rule table for identifying the performance level based on the performance state information. According to an embodiment of the disclosure, the electronic device 1000 may obtain the rule for identifying the performance level, by using an AI model.

In operation S720, the electronic device 1000 may identify the processing path for obtaining a response corresponding to a voice of a user, based on a result of comparing the performance level with a first reference level. According to an embodiment of the disclosure, the first reference level may be predetermined. According to another embodiment of the disclosure, the first reference level may be adaptively determined based on the performance state information of the electronic device 1000. For example, the electronic device 1000 may determine the first reference level based on at least one of a highest value, a lowest value, or the amount of change of the performance state information.

When the performance level is lower than the first reference level, the electronic device 1000 may perform operation S730. In operation S730, the electronic device 1000 may identify the processing path such that the response corresponding to the voice of the user is obtained by the electronic device 1000. According to an embodiment of the disclosure, the electronic device 1000 may perform a control operation to recognize a voice command from voice data by using a built-in voice assistant service engine and obtain the response corresponding to the voice command.

When the performance level is higher than or equal to the first reference level, the electronic device 1000 may perform operation S740. In operation S740, the electronic device 1000 may identify the processing path such that the response corresponding to the voice of the user is obtained by the voice service server 2000. According to an embodiment of the disclosure, the electronic device 1000 may perform a control operation to transmit the voice data to the voice service server 2000 and receive the response obtained from the voice service server 2000. According to another embodiment of the disclosure, the electronic device 1000 may perform a control operation to recognize the voice command from the voice data, transmit the recognized voice command to the voice service server 2000, and receive the response obtained from the voice service server 2000. For example, the electronic device 1000 may perform a control operation to execute an STT function of converting the voice data into text and obtain text data, transmit the text data to the voice service server 2000, and receive the response obtained from the voice service server 2000.

Figure 8:
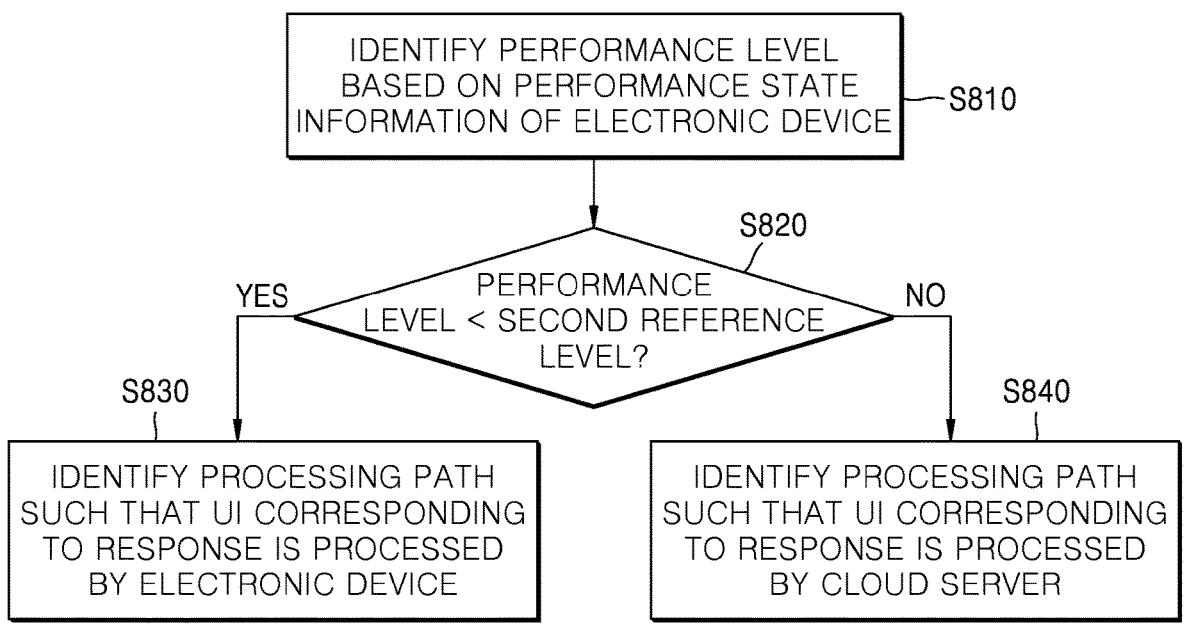
FIG. 8 is another flowchart of a method, performed by an electronic device, of identifying a processing path, according to various embodiments of the disclosure.

FIG. 8 is another flowchart of a method, performed by the electronic device 1000, of identifying a processing path, according to various embodiments of the disclosure. The operating method of the electronic device 1000 illustrated in FIG. 8 may be performed by the electronic device 1000 or the processor 210 of the electronic device 1000 according to an embodiment of the disclosure described with reference to FIGS. 1 through 5. The operations illustrated in FIG. 8 may correspond to operation S620 illustrated in FIG. 6.

Referring to FIG. 8, in operation S810, the electronic device 1000 may identify a performance level of the electronic device 1000 based on performance state information of the electronic device 1000. Operation S801 may correspond to operation S710 illustrated in FIG. 7, and thus, repeated descriptions are not given.

In operation S820, the electronic device 1000 may identify the processing path for processing a UI corresponding to a response, based on a result of comparing the performance level with a second reference level. According to an embodiment of the disclosure, the second reference level may be predetermined. According to another embodiment of the disclosure, the second reference level may be adaptively determined based on the performance state information of the electronic device 1000. For example, the electronic device 1000 may determine the second reference level based on at least one of a highest value, a lowest value, or the amount of change of the performance state information.

According to an embodiment of the disclosure, the first reference level described with reference to FIG. 7 and the second reference level described with reference to FIG. 8 may be different from each other. According to an embodiment of the disclosure, methods of determining the first reference level and the second reference level may be different from each other.

When the performance level is lower than the second reference level, the electronic device 1000 may perform operation S830. In operation S830, the electronic device 1000 may identify the processing path such that a UI corresponding to a response is processed by the electronic device 1000. According to an embodiment of the disclosure, the electronic device 1000 may perform a control operation to process the UI corresponding to the response corresponding to a voice of a user by using a built-in UI renderer.

When the performance level is higher than or equal to the second reference level, the electronic device 1000 may perform operation S840. In operation S840, the electronic device 1000 may identify the processing path such that the UI corresponding to the response is processed by the cloud UI server 3000. According to an embodiment of the disclosure, the electronic device 1000 may perform a control operation to receive, from the cloud UI server 3000, the UI processed by the cloud UI server 3000, rather than directly processing the UI.

Figure 9:
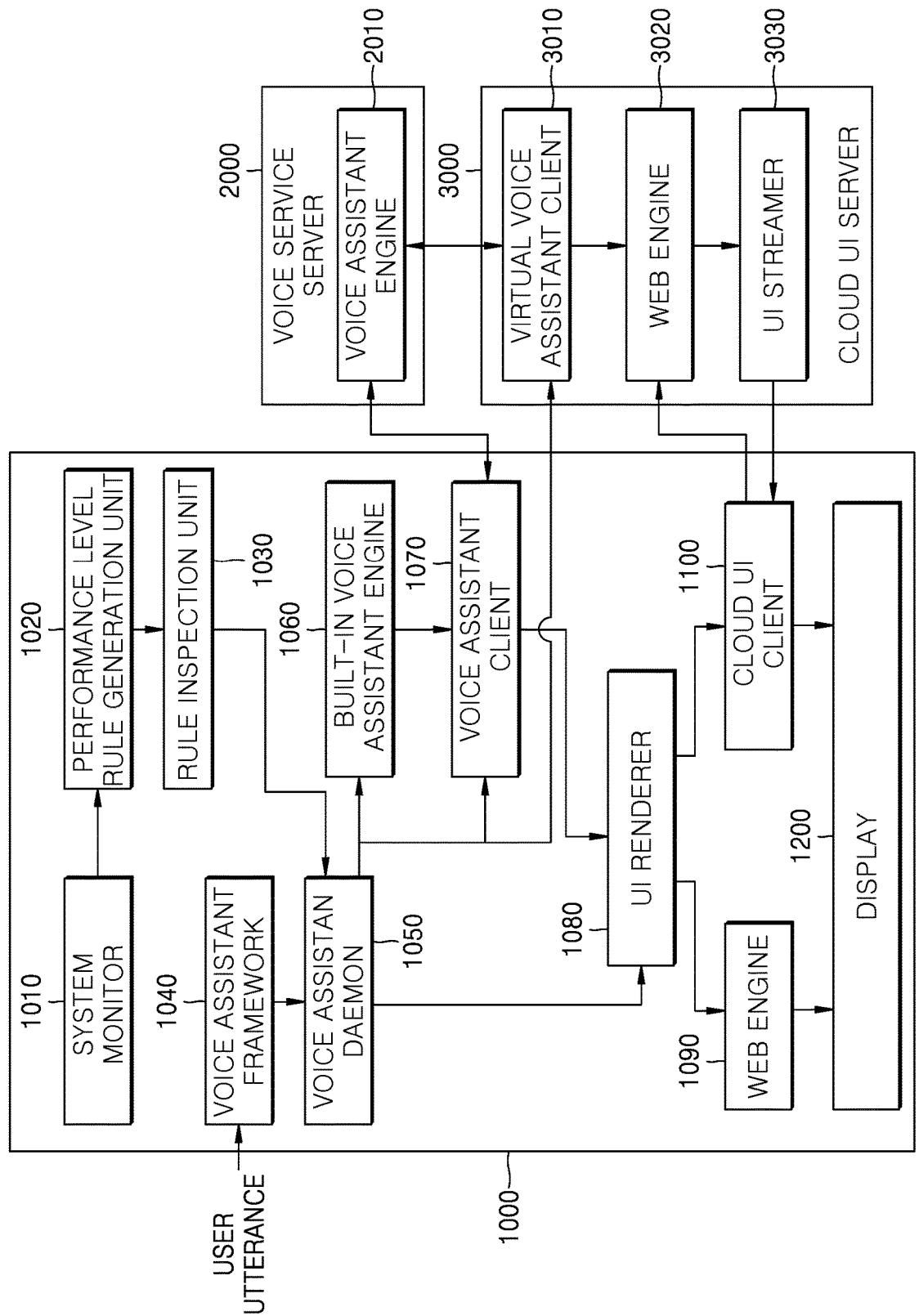
FIG. 9 is a diagram for describing an operation of a system for providing a voice assistant service, according to various embodiments of the disclosure.

FIG. 9 is a diagram for describing an operation of a system for providing a voice assistant service, according to various embodiments of the disclosure.

Referring to FIG. 9, the system for providing the voice assistant service may include the electronic device 1000, the voice service server 2000, and the cloud UI server 3000.

The electronic device 1000 according to various embodiments of the disclosure may include a system monitor 1010, a performance level rule generation unit 1020, a rule inspection unit 1030, a voice assistant framework 1040, a voice assistant daemon 1050, a built-in voice assistant engine 1060, a voice assistant client 1070, a UI renderer 1080, a web engine 1090, a cloud UI client 1100, and a display 1200.

The system monitor 1010 may monitor a performance state of the electronic device 1000 in real time and output a result of the monitoring as performance state information. According to an embodiment of the disclosure, the system monitor 1010 may monitor the amount of resource use or the processing amount per unit time of the electronic device 1000. For example, the performance state information may include at least one of the amount of processor use, the amount of memory use, an input and output speed of a storage, or a transmission and reception speed of a network, with respect to the electronic device 1000.

The performance level rule generation unit 1020 may generate, based on the performance state information generated by the system monitor 1010, a rule for determining a performance level. According to an embodiment of the disclosure, the performance level rule generation unit 1020 may flexibly change a predefined rule based on the performance state information.

According to an embodiment of the disclosure, the performance level rule generation unit 1020 may generate or change a performance level rule based on a highest value, a lowest value, and the change amount of the performance state information. For example, even when the amount of resource use or the processing amount per unit time that is monitored is below a criterion on average, the performance level rule may be generated to relatively more negatively evaluate the performance level of the system, when a width of change in real time is relatively great. On the contrary, even when the amount of resource use or the processing amount per unit time that is monitored is above criterion on average, the performance level rule may be generated to relatively more positively evaluate the performance level of the system, when the width of change in real time is relatively little.

According to an embodiment of the disclosure, the performance level rule generation unit 1020 may generate the rule for determining the performance level, by using an AI model. For example, the performance level rule generation unit 1020 may train the AI model by using the performance state information.

The rule inspection unit 1030 may determine a current performance level based on current performance state information and the performance level rule generated by the performance level rule generation unit 1020.

The voice assistant framework 1040 may obtain voice data by sensing a speaking event of a user. According to an embodiment of the disclosure, the voice assistant framework 1040 may sense the speaking event of the user, based on a condition in which the user presses on a voice command button of the electronic device 1000, a condition in which a wake-up command of the user is received, or a condition in which a predetermined signal is received from an external device. According to an embodiment of the disclosure, the voice assistant framework 1040 may obtain the voice data by recording audio received from a microphone included in the electronic device 1000. According to another embodiment of the disclosure, the voice assistant framework 1040 may receive the voice data transmitted from an external device.

The voice assistant daemon 1050 may determine a processing path for generating a response corresponding to a voice of the user and rendering a UI corresponding to the response, based on the current performance level determined by the rule inspection unit 1030. According to an embodiment of the disclosure, based on the determined processing a path, the voice assistant daemon 1050 may transmit data and/or a request to generate the response corresponding to the voice of the user and render the UI corresponding to the response according to the corresponding processing path.

According to an embodiment of the disclosure, the voice assistant daemon 1050 may determine the processing path such that the response corresponding to the voice of the user is directly generated by the electronic device 1000 or is generated by the voice assistant server 2000. For example, when the processing path is determined such that the response corresponding to the voice of the user is directly generated by the electronic device 1000, the voice assistant daemon 1050 may input the voice data of the user obtained by the voice assistant framework 1040 into the built-in voice assistant engine 1060, so that a voice command may be recognized and the corresponding response may be generated. As another example, when the processing path is determined such that the response corresponding to the voice of the user is generated by the voice service server 2000, the voice assistant daemon 1050 may control the voice assistant client 1070 to transmit the voice data to the voice service server 2000 and receive, from the voice service server 2000, a response generated by the voice service server 2000. Alternatively, the voice assistant daemon 1050 may control the built-in voice assistant engine 1060 to recognize the voice command from the voice data and may control the voice assistant client 1070 to transmit the recognized voice command to the voice service server 2000 and receive the response generated by the voice service server 2000.

According to an embodiment of the disclosure, the voice assistant daemon 1050 may determine the processing path such that the UI corresponding to the response is directly rendered by the electronic device 1000 or is rendered by the cloud UI server 3000. For example, the voice assistant daemon 1050 may control the UI renderer 1080 to transmit the generated or received response to the web engine 1090 of the electronic device 1000 or a web engine 3020 of the cloud UI server 3000 so that the UI corresponding to the response may be rendered. Alternatively, the voice assistant daemon 1050 may control the cloud UI server 3000 to receive the response generated by the voice service server 2000 and generate the corresponding UI and control the electronic device 1000 to receive the rendered UI from the cloud UI server 3000.

The built-in voice assistant engine 1060 may be a voice assistant service provision module or application loaded or stored in the electronic device 1000. According to an embodiment of the disclosure, the built-in voice assistant engine 1060 may receive the voice data, recognize the voice command of the user, and generate the response corresponding to the recognized voice command. According to another embodiment of the disclosure, the built-in voice assistant engine 1060 may recognize the voice command of the user from the voice data and input the recognized voice command to the voice assistant client 1070 so that the recognized voice command may be transmitted to the voice service server 2000.

According to an embodiment of the disclosure, the response generated by the built-in voice assistant engine 1060 may be output in the form of a source code which may be rendered according to a predetermined rule. For example, the generated response may be output in the form of an HTML document which may be rendered by a web browser.

According to an embodiment of the disclosure, the built-in voice assistant engine 1060 may include an AI model. The AI model may be pre-trained and may be loaded on the electronic device 1000, and may be updated by continually learning the voice data of the user. The AI model included in the built-in voice assistant engine 1060 may be a light version AI model requiring a fewer resources than a voice assistant engine 2010 included in the voice service server 2000.

The voice assistant client 1070 may be a module or application for executing an interface function of the electronic device 1000 for communicating with the voice service server 2000. When the response corresponding to the voice of the user is determined to be generated by the voice service server 2000, the voice assistant client 1070 may transmit the voice data to the voice service server 2000, receive the response generated by the voice service server 2000, and transmit the response to the UI renderer 1080.

The UI renderer 1080 may transmit the response received from the voice assistant client 1070, according to the processing path determined by the voice assistant daemon 1050.

When the UI corresponding to the response is determined to be directly rendered by the electronic device 1000, the UI renderer 1080 may input the response into the web engine 1090 so that the UI corresponding to the response may be rendered. When the UI corresponding to the response is determined to be rendered by the cloud UI server 3000, the UI renderer 1080 may perform a control operation to transmit the response to the cloud UI server 3000 so that the corresponding UI may be generated, and to receive the rendered UI from the cloud UI server 3000.

The web engine 1090 may be a module or an application of the electronic device 1000, which may render the UI corresponding to the response. According to an embodiment of the disclosure, the web engine may render the response in the form of a source code according to a predetermined rule. For example, the web engine may be a web browser which may render an HTML document.

The cloud UI client 1100 may be a module or an application executing an interface function of the electronic device 1000 for communicating with the cloud UI server 3000. When the response corresponding to the voice of the user is determined to be generated by the voice service server 2000, the cloud UI client 1100 may transmit the response to the cloud UI server 3000 so that the corresponding UI may be generated, and may receive the rendered UI from the cloud UI server 3000.

The display 1200 may output the rendered UI on a screen. The display 1200 may correspond to the display 220 or the display 515 illustrated in FIG. 2 or 5, and thus, repeated descriptions are not given.

The voice service server 2000 may include the voice assistant engine 2010. According to an embodiment of the disclosure, the voice assistant engine 2010 may receive the voice data transmitted from the electronic device 100, recognize the voice command of the user, and generate the response corresponding to the recognized voice command. According to an embodiment of the disclosure, the voice assistant engine 2010 may receive the voice command transmitted from the electronic device 100 and generate the response corresponding to the recognized voice command. According to an embodiment of the disclosure, the voice assistant engine 2010 may transmit the generated response to the electronic device 1000 so that the UI corresponding to the response may be rendered. According to an embodiment of the disclosure, the voice assistant engine 2010 may transmit the generated response to the cloud UI server 3000 so that the UI corresponding to the response may be rendered.

The cloud UI server 3000 may include a virtual voice assistant client 3010, a web engine 3020, and a UI streamer 3030.

The virtual voice assistant client 3010 may be a module or an application executing an interface function of the cloud UI server 3000 for communicating with the voice service server 2000. The virtual voice assistant client 3010 may operate on the cloud UI server 3000 like the voice assistant client 1070 functions on the electronic device 1000. When the response corresponding to the voice of the user is determined to be generated by the voice service server 2000, the virtual voice assistant client 3010 may receive the voice data from the electronic device 1000, transmit the received voice data to the voice service server 2000, receive the response generated by the voice service server 2000, and transmit the received response to the web engine 3020.

The web engine 3020 may be a module or an application of the cloud UI server 3000, which may render the UI corresponding to the response. The function of the web engine 3020 may correspond to the function of the web engine 1090 of the electronic device 1000, and thus, repeated descriptions are not given.

The UI streamer 3030 may stream the UI rendered by the web engine 3020 to the electronic device 1000. For example, the UI streamer 3030 may transmit image data corresponding to a rendered UI screen to the electronic device 1000.

Figure 10:
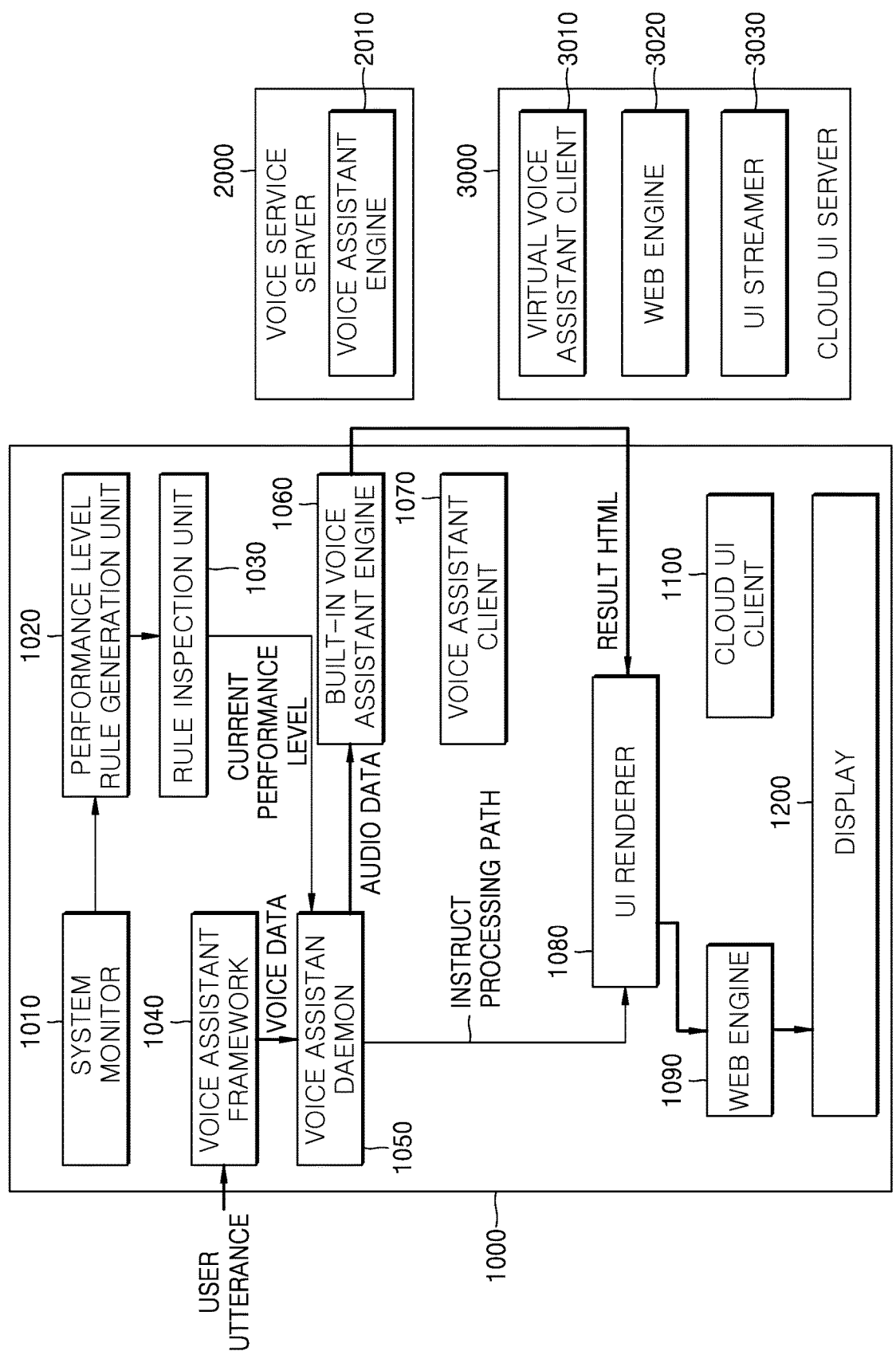
FIG. 10 is a diagram for describing an operation of a system for providing a voice assistant service when a performance condition of an electronic device is good, according to an embodiment of the disclosure.

FIG. 10 is a diagram for describing an operation of a system for providing a voice assistant service when a performance condition of the electronic device 1000 is good, according to an embodiment of the disclosure.

According to an embodiment of the disclosure, based on the current performance state information of the electronic device 1000 and the performance level rule, the rule inspection unit 1030 may determine that the current performance level corresponds to a good state, and the system is in an idle condition. In this case, the voice assistant daemon 1050 may determine the processing path such that the response corresponding to the voice of the user is directly generated by the electronic device 1000, and the UI corresponding to the response is also directly rendered by the electronic device 1000.

The voice assistant daemon 1050 may transmit the voice data of the user obtained by the voice assistant framework 1040 to the built-in voice assistant engine 1060. The built-in voice assistant engine 1060 may receive the voice data, recognize the voice command of the user, and generate the response corresponding to the recognized voice command. The built-in voice assistant engine 1060 may transmit the generated response to the UI renderer 1080.

The UI renderer 1080 may transmit the response to the web engine 1090, according to the processing path determined by the voice assistant daemon 1050. The web engine 1090 may render the UI corresponding to the received response.

FIG. 11 is a diagram for describing an operation of a system for providing a voice assistant service when a performance condition of the electronic device 1000 is normal, according to an embodiment of the disclosure.

According to an embodiment of the disclosure, based on the current performance state information of the electronic device 1000 and the performance level rule, the rule inspection unit 1030 may determine that the current performance level corresponds to a normal state, and a system load is low. In this case, the voice assistant daemon 1050 may determine the processing path such that the response corresponding to the voice of the user is generated by the voice service server 2000, and the UI corresponding to the response is directly rendered by the electronic device 1000.

The voice assistant daemon 1050 may transmit the voice data of the user obtained by the voice assistant framework 1040 to the voice assistant client 1070. The voice assistant client 1070 may transmit the voice data to the voice service server 2000.

The voice assistant engine 2010 of the voice service server 2000 may receive the voice data, recognize the voice command of the user, and generate the response corresponding to the recognized voice command. The voice assistant engine 2010 may transmit the generated response to the voice assistant client 1070. The voice assistant client 1070 may receive the response generated by the voice service server 2000 and transmit the received response to the UI renderer 1080.

The UI renderer 1080 may transmit the response to the web engine 1090 according to the processing path determined by the voice assistant daemon 1050. The web engine 1090 may render the UI corresponding to the received response so that the rendered UI may be displayed on the display 1200.

FIG. 12 is a diagram for describing an operation of a system for providing a voice assistant service when a performance condition of the electronic device 1000 is bad, according to an embodiment of the disclosure.

According to an embodiment of the disclosure, based on the current performance state information of the electronic device 1000 and the performance level rule, the rule inspection unit 1030 may determine that the current performance level corresponds to a bad state, and a system load is high. In this case, the voice assistant daemon 1050 may determine the processing path such that the response corresponding to the voice of the user is generated by the voice service server 2000, and the UI corresponding to the response is rendered by the cloud UI server 3000.

The voice assistant daemon 1050 may transmit the voice data of the user obtained by the voice assistant framework 1040 to the voice assistant client 1070. The voice assistant client 1070 may transmit the voice data to the voice service server 2000.

The voice assistant engine 2010 of the voice service server 2000 may receive the voice data, recognize the voice command of the user, and generate the response corresponding to the recognized voice command. The voice assistant engine 2010 may transmit the generated response to the voice assistant client 1070. The voice assistant client 1070 may receive the response generated by the voice service server 2000 and transmit the received response to the UI renderer 1080.

The UI renderer 1080 may transmit the response to the cloud UI client 1100 according to the processing path determined by the voice assistant daemon 1050. The cloud UI client 1100 may transmit the response to the web engine 3020 of the cloud UI server 3000.

The web engine 3020 of the cloud UI server 3000 may render the UI corresponding to the received response. The UI streamer 3030 of the cloud UI server 3000 may stream the UI rendered by the web engine 3020 to the electronic device 1000. The cloud UI client 1100 may receive, from the UI streamer 3030, image data corresponding to a rendered UI screen, so that the display 1200 may display the image data.

FIG. 13 is a diagram for describing an operation of a system for providing a voice assistant service when a performance condition of the electronic device 1000 is very bad, according to an embodiment of the disclosure.

According to an embodiment of the disclosure, based on the current performance state information of the electronic device 1000 and the performance level rule, the rule inspection unit 1030 may determine that the current performance level corresponds to a very bad state, and a system load is critical. In this case, the voice assistant daemon 1050 may determine the processing path such that while the response corresponding to the voice of the user is generated by the voice service server 2000, and the UI corresponding to the response is directly rendered by the cloud UI server 3000, the voice service server 2000 and the cloud UI server 3000 perform direct communication with each other without intervention of the electronic device 1000.

The voice assistant daemon 1050 may transmit the voice data of the user obtained by the voice assistant framework 1040 directly to the virtual voice assistant client 3010 of the cloud UI server 3000. The virtual voice assistant client 3010 may transmit the voice data to the voice service server 2000.

The voice assistant engine 2010 of the voice service server 2000 may receive the voice data, recognize the voice command of the user, and generate the response corresponding to the recognized voice command. The voice assistant engine 2010 may transmit the generated response to the virtual voice assistant client 3010. The virtual voice assistant client 3010 may receive the response generated by the voice service server 2000 and transmit the received response to the web engine 3020.

The web engine 3020 may render the UI corresponding to the received response. The UI streamer 3030 may stream the UI rendered by the web engine 3020 to the electronic device 1000. The cloud UI client 1100 of the electronic device 1000 may receive, from the UI streamer 3030, image data corresponding to a rendered UI screen, so that the display 1200 may display the image data.

FIG. 14 is a diagram of a performance rule table according to an embodiment of the disclosure.

For example, FIG. 14 illustrates a performance rule table in which a performance level is divided into 4 types based on the amount of processor (CPU) use and the amount of memory (DDR) use. The numerals indicate a resource use rate, and 0 indicates a state in which all resources are available, and 1 indicates a state in which all resources are in use.

FIG. 14 illustrates an example in which the performance level is determined only based on the amount of processor and memory use. However, the performance rule table may be defined based on various indexes. For example, the performance rule table may be defined based on performance state information, such as the amount of processor use, the amount of memory use, an input and output speed of a storage, a transmission and reception speed of a network, etc., and the number of used indexes may also be arbitrarily configured. Also, FIG. 14 illustrates the example in which the performance level is divided into four types. However, the number of performance levels may be arbitrarily configured.

According to an embodiment of the disclosure, the performance rule table may be pre-defined and stored in the electronic device 1000. According to another embodiment of the disclosure, the performance rule table may be generated based on the performance state information of the electronic device 1000. For example, the performance rule table may have a predetermined default value and may be flexibly adjusted according to an actual change of the performance state information of the electronic device 1000.

According to an embodiment of the disclosure, the performance rule table may be generated by using an AI model. For example, the AI model may learn the performance state information and a result of processing based on the processing path and may search for an optimal processing path according to the performance state information.

Figure 15:
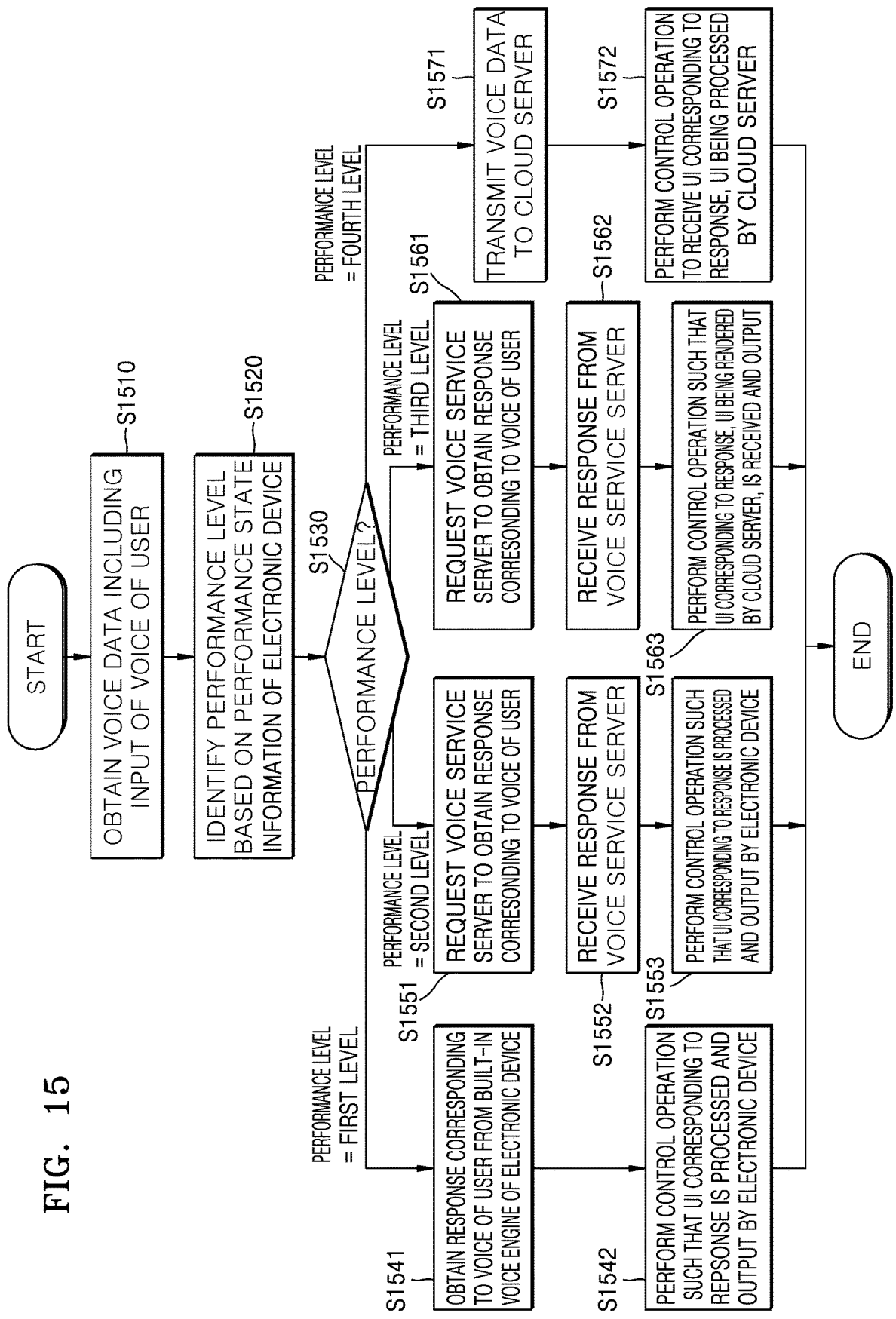
FIG. 15 is a flowchart of a method, performed by an electronic device, of providing a voice assistant service, according to an embodiment of the disclosure.

FIG. 15 is a flowchart of a method, performed by the electronic device 1000, of providing a voice assistant service, according to an embodiment of the disclosure. The operating method of the electronic device 1000 illustrated in FIG. 15 may be performed by the electronic device 1000 or the processor 210 of the electronic device 1000 according to an embodiment of the disclosure described with reference to FIGS. 1 through 5.

Referring to FIG. 15, in operation S1510, the electronic device 1000 may obtain voice data including an input of a voice of a user. Operation S1510 may correspond to operation S610 illustrated in FIG. 6, and thus, repeated descriptions are not given.

In operation S1520, the electronic device 1000 may identify a performance level of the electronic device 1000 based on performance state information of the electronic device 1000. According to the present embodiment, the performance level may be identified as one of a first level through a fourth level. Operation S1510 may correspond to operation S710 illustrated in FIG. 7, and thus, repeated descriptions are not given.

In operation S1530, the electronic device 1000 may identify, based on the performance level, a processing path for obtaining a response corresponding to a voice of the user and processing a UI corresponding to the response.

When the performance level is the first level, the electronic device 1000 may determine the processing path such that the response corresponding to the voice of the user is obtained by the electronic device 1000, and the UI corresponding to the response is processed by the electronic device 1000, and the electronic device 1000 may perform operations S1541 and S1542. In operation S1541, the electronic device 1000 may recognize a voice command from voice data by using a built-in voice assistant service engine and obtain the response corresponding to the voice command. In operation S1542, the electronic device 1000 may perform a control operation to process and output the UI corresponding to the response corresponding to the voice of the user by using a built-in UI renderer.

When the performance level is the second level, the electronic device 1000 may determine the processing path such that the response corresponding to the voice of the user is determined by the voice service server 2000, and the UI corresponding to the response is processed by the electronic device 1000, and the electronic device 1000 may perform operations S1551 through S1553. In operation S1551, the electronic device 1000 may request the voice service server 2000 to obtain the response corresponding to the voice of the user. According to an embodiment of the disclosure, the electronic device 1000 may transmit the voice data to the voice service server 2000. According to another embodiment of the disclosure, the electronic device 1000 may recognize a voice command from the voice data and transmit the recognized voice command to the voice service server 2000. In operation S1552, the electronic device 1000 may receive the response obtained from the voice service server 2000. In operation S1553, the electronic device 1000 may perform a control operation to process and output the UI corresponding to the response corresponding to the voice of the user by using a built-in UI renderer.

When the performance level is the third level, the electronic device 1000 may determine the processing path such that the response corresponding to the voice of the user is determined by the voice service server 2000, and the UI corresponding to the response is processed by the cloud UI server 3000, and the electronic device 1000 may perform operations S1561 through S1563. In operation S1561, the electronic device 1000 may request the voice service server 2000 to obtain the response corresponding to the voice of the user. According to an embodiment of the disclosure, the electronic device 1000 may transmit the voice data to the voice service server 2000. According to another embodiment of the disclosure, the electronic device 1000 may recognize the voice command from the voice data and transmit the recognized voice command to the voice service server 2000. In operation S1562, the electronic device 1000 may receive the response obtained from the voice service server 2000. In operation S1563, the electronic device 1000 may transmit the response to the cloud UI server 3000. The electronic device 1000 may perform a control operation to receive and output the UI corresponding to the response, the UI being processed by the cloud UI server 3000.

When the performance level is the fourth level, the electronic device 1000 may determine the processing path such that while the response corresponding to the voice of the user is processed by the voice service server 2000, and the UI corresponding to the response is processed by the cloud UI server 3000, the voice service server 2000 and the cloud UI server 3000 may perform direct communication with each other without intervention of the electronic device 1000, and the electronic device 1000 may perform operations S1571 and S1572. In operation S1571, the electronic device 1000 may transmit the voice data to the voice service server 2000. In operation S1572, the electronic device 1000 may perform a control operation to receive and output the UI corresponding to the response, the UI being processed by the cloud UI server 3000.

Figure 16:
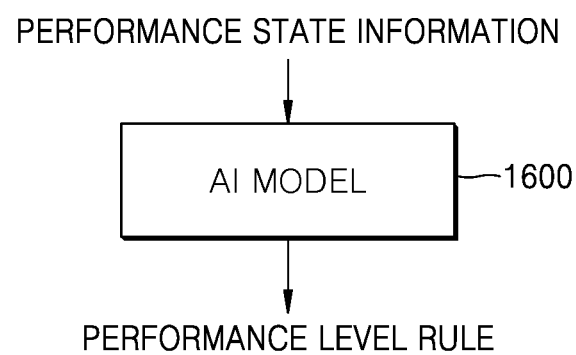
FIG. 16 is a diagram for describing an operation of an artificial intelligence (AI) model according to an embodiment of the disclosure.

FIG. 16 is a diagram for describing an operation of an AI model according to an embodiment of the disclosure.

The AI model 1600 may provide a function of receiving performance state information and generating a performance level rule for determining a performance level. The AI model 1600 may learn the performance state information and a result of processing based on the processing path and may search for an optimal processing path according to the performance state information. According to various embodiments of the disclosure, the AI model may be a learning model that is trained by using, as an AI algorithm, at least one of machine learning, neural networks, genes, deep-learning, or a classification algorithm.

According to an embodiment of the disclosure, the AI model 1600 may include an artificial neural network having a structure of a plurality of layers. The artificial neural network may include an input layer, at least one hidden layer, and an output layer. Also, calculation through the artificial neural network may be performed by a processor in the electronic device 1000. Also, a parameter between each layer and a node may be trained through the learning and training performed in the hidden layer.

For example, the processor in the electronic device 1000 may obtain values of parameters related to elements affecting the extraction of the performance level rule from the performance state information, through repeated learning. For example, the processor in the electronic device 1000 may obtain the values of the parameters affecting the performance level from features of the performance state information. For example, the processor in the electronic device 1000 may obtain the values of the parameters affecting the determination of the processing path according to the performance level. Also, the electronic device 1000 may re-train the AI model to reflect the obtained values of the parameters.

Figure 17:
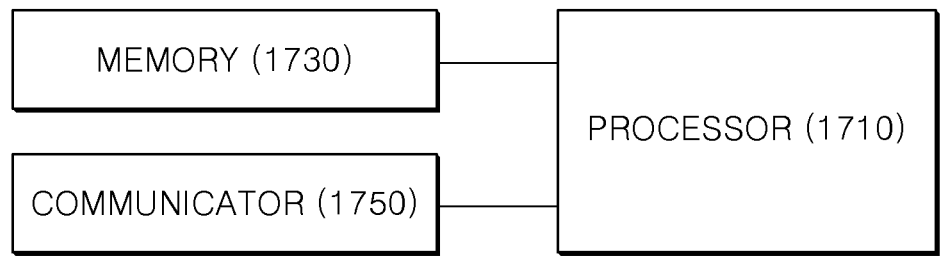
FIG. 17 is a block diagram of a cloud server communicating with an electronic device according to various embodiments of the disclosure.

FIG. 17 is a block diagram of a cloud server 3000 communicating with the electronic device 1000 according to various embodiments of the disclosure.

Referring to FIG. 17, the cloud server 3000 may include a processor 1710, a memory 1730, and a communicator 1750. The cloud server 3000 may perform UI rendering and streaming according to an embodiment of the disclosure.

The processor 1810 may control general operations of the server 3000. For example, the processor 1710 may generally control the memory 1730, the communicator 1750, etc. by executing programs stored in the memory 1730 of the cloud server 3000. For example, the processor 1710 may control the UI rendering and streaming by executing the programs stored in the memory 1730. The processor 1710 may perform an operation to transmit the rendered UI to the electronic device 1000 or an operation to transmit and receive data to and from the electronic device 1000.

The memory 1730 may store at least one of at least one instruction, a program, or data required for the cloud server 3000 to perform a predetermined operation.

The communicator 1750 may include one or more components enabling communication with the electronic device 1000. Detailed components of the communicator 1750 may correspond to the components of the communicator 232 described with reference to FIG. 4, and thus, detailed descriptions are omitted.

The operating method of the electronic device according to an embodiment of the disclosure may be implemented as a program command which may be executed by various computer devices and may be recorded on a computer-readable medium. Also, according to an embodiment of the disclosure, one or more programs including instructions for executing the operating method of the electronic device may be recorded on a computer-readable recording medium.

The computer-readable medium may include program commands, data files, data structures, or the like or a combination thereof. The program commands recorded on the computer-readable recording medium may be specially designed and constructed for the disclosure or may be known to and usable by one of ordinary skill in a field of computer software. Examples of the computer-readable medium include magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

Here, a machine-readable storage medium may be provided in a form of a non-transitory storage medium. Here, the "non-transitory storage medium" only denotes a tangible device and does not contain a signal (for example, electromagnetic waves). This term does not distinguish a case where data is stored in the storage medium semi-permanently and a case where the data is stored in the storage medium temporarily. For example, the "non-transitory storage medium" may include a buffer where data is temporarily stored.

According to an embodiment, a method according to various embodiments disclosed in the present specification may be provided by being included in a computer program product. The computer program product may be transacted between a seller and a purchaser. The computer program product may be distributed in a form of machine-readable storage medium (for example, a CD-ROM), or distributed (for example, downloaded or uploaded) through an application store or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

What is claimed is:

1. A method, performed by an electronic device, of providing a voice assistant service, the method comprising:
obtaining voice data including a user voice input;

according to a performance level based on performance state information of the electronic device when the voice data is obtained, identifying a processing path for recognizing a voice command from the voice data and obtaining a response corresponding to the voice command, and for processing a user interface (UI) corresponding to the response; and based on the identified processing path, performing a corresponding function to process the voice data and obtain and output the processed UI.

2. The method of claim 1, wherein the performance state information of the electronic device includes at least one of an amount of processor use, an amount of memory use, an input and output speed of a storage, or a transmission and reception speed of a network, with respect to the electronic device.

3. The method of claim 1, wherein the performance state information of the electronic device is obtained by monitoring, in real time, a performance state of the electronic device.

4. The method of claim 1, wherein the identifying of the processing path includes:

obtaining, based on the performance state information of the electronic device, a rule for identifying the performance level;

identifying the performance level, based on the obtained rule and the performance state information; and identifying the processing path, based on the identified performance level.

5. The method of claim 4, wherein the obtaining of the rule includes:

training an artificial intelligence (AI) model by using the performance state information of the electronic device; and obtaining, by using the trained AI model, the rule for identifying the performance level.

6. The method of claim 1, wherein the identifying of the processing path includes:

identifying the processing path such that the response corresponding to the voice command is obtained by the electronic device, when the performance level is lower than a first reference level; and identifying the processing path such that the response corresponding to the voice command is obtained by a voice service server, when the performance level is higher than or equal to the first reference level.

7. The method of claim 6, wherein the performing of the corresponding function to process the voice data includes, when the processing path is identified such that the response corresponding to the voice command is obtained by the voice service server, transmitting the voice data to the voice service server.

8. The method of claim 1, wherein the identifying of the processing path includes:

identifying the processing path such that the UI is processed by the electronic device, when the performance level is lower than a second reference level; and identifying the processing path such that the UI is processed by a cloud server, when the performance level is higher than or equal to the second reference level.

9. The method of claim 8, wherein the performing of the corresponding function to obtain and output the processed UI includes, when the processing path is identified such that the UI is processed by the cloud server, receiving, from the cloud server, video streaming including the processed UI.

10. The method of claim 1, wherein the performance level is identified as one of a first level, a second level, a third level, and a fourth level, and the performing of the corresponding function to process the voice data and obtain and output the processed UI includes:

when the performance level is identified as the first level, performing the corresponding function to: obtain the response corresponding to the voice command; and process and output the UI corresponding to the response;

when the performance level is identified as the second level, performing the corresponding function to: request a voice service server to obtain the response corresponding to the voice command; receive, from the voice service server, the obtained response; and process and output the UI corresponding to the received response;

when the performance level is identified as the third level, performing the corresponding function to: request the voice service server to obtain the response corresponding to the voice command; and receive and output the UI corresponding to the obtained response, the UI being processed by a cloud server; and when the performance level is identified as the fourth level, performing the corresponding function to: transmit the voice data to the cloud server; and receive and output the UI corresponding to the obtained response, the UI being processed by the cloud server.

11. A non-transitory computer-readable recording medium having recorded thereon a program for causing a computer to perform the method of claim 1.

12. An electronic device for providing a voice assistant service, the electronic device comprising:

a memory storing instructions; and at least one processor functionally integrated with the memory, wherein the at least one processor is configured to execute the instructions to:

obtain voice data including a user voice input;

according to a performance level based on performance state information of the electronic device when the voice data is obtained, identify a processing path for recognizing a voice command from the voice data obtaining a response corresponding to the voice command, and for processing a user interface (UI) corresponding to the response; and based on the identified processing path, perform a corresponding function to process the voice data and obtain and output the processed UI.

13. The electronic device of claim 12, wherein the performance state information of the electronic device includes at least one of an amount of processor use, an amount of memory use, an input and output speed of a storage, or a transmission and reception speed of a network, with respect to the electronic device.

14. The electronic device of claim 12, wherein the at least one processor is further configured to execute the instructions to obtain the performance state information of the electronic device by monitoring, in real time, a performance state of the electronic device.

15. The electronic device of claim 12, wherein the at least one processor is further configured to execute the instructions to:

obtain, based on the performance state information of the electronic device, a rule for identifying the performance level;

identify the performance level, based on the obtained rule and the performance state information; and identify the processing path, based on the identified performance level.

16. The electronic device of claim 15, wherein the at least one processor is further configured to execute the instructions to:

train an artificial intelligence (AI) model by using the performance state information of the electronic device; and obtain, by using the trained AI model, the rule for identifying the performance level.

17. The electronic device of claim 12, wherein the at least one processor is further configured to execute the instructions to:

identify the processing path such that the response corresponding to the voice command is obtained by the electronic device, when the performance level is lower than a first reference level; and identify the processing path such that the response corresponding to the voice command is obtained by a voice service server, when the performance level is higher than or equal to the first reference level.

18. The electronic device of claim 17, wherein the at least one processor is further configured to execute the instructions to, when the processing path is identified such that the response corresponding to the voice command is obtained by the voice service server, transmit the voice data to the voice service server.

19. The electronic device of claim 12, wherein the at least one processor is further configured to execute the instructions to:

identify the processing path such that the UI is processed by the electronic device, when the performance level is lower than a second reference level; and identify the processing path such that the UI is processed by a cloud server, when the performance level is higher than or equal to the second reference level.

20. The electronic device of claim 19, wherein the at least one processor is further configured to execute the instructions to, when the processing path is identified such that the UI is processed by the cloud server, receive, from the cloud server, video streaming including the processed UI.

* * * * *